US012597343B2

(12) United States Patent
Morita et al.

(10) Patent No.: US 12,597,343 B2
(45) Date of Patent: Apr. 7, 2026

(54) LIGHT EMITTING DEVICE AND TRAFFIC SYSTEM

(71) Applicant: NICHIA CORPORATION, Anan (JP)

(72) Inventors: Ichimaru Morita, Komatsushima (JP); Naoya Masuda, Tokushima (JP); Moriyasu Fukuhara, Anan (JP)

(73) Assignee: NICHIA CORPORATION, Anan (JP)

( * ) Notice: Subject to any disclaimer, the term of this patent is extended or adjusted under 35 U.S.C. 154(b) by 14 days.

(21) Appl. No.: 18/673,268

(22) Filed: May 23, 2024

(65) Prior Publication Data

US 2024/0395137 A1 Nov. 28, 2024

(30) Foreign Application Priority Data

May 25, 2023 (JP) ................................ 2023-086035
Dec. 22, 2023 (JP) ................................ 2023-216736

(51) Int. Cl.

*G08G 1/095* (2006.01)
*F21S 8/08* (2006.01)
*F21W 131/103* (2006.01)
*F21Y 113/00* (2016.01)

(52) U.S. Cl.

CPC .............. *G08G 1/095* (2013.01); *F21S 8/086* (2013.01); *F21W 2131/103* (2013.01); *F21Y 2113/00* (2013.01)

(58) Field of Classification Search

None
See application file for complete search history.

(56) References Cited

U.S. PATENT DOCUMENTS

2019/0197881 A1 6/2019 Camras et al.
2019/0197882 A1 6/2019 Camras et al.
2019/0197883 A1 6/2019 Camras et al.
2020/0231085 A1* 7/2020 Kunii ........................ B60Q 1/54
2021/0197846 A1* 7/2021 Thakur .................. B60Q 1/545
2022/0379806 A1* 12/2022 Spoor .................. B60Q 1/0023
2022/0410795 A1* 12/2022 Tatara ..................... F21S 43/15

FOREIGN PATENT DOCUMENTS

| | | |
|---|---|---|
| JP | 2014-056434 | 3/2014 |
| JP | 2019-079820 | 5/2019 |
| JP | 2019-087037 | 6/2019 |
| JP | 2021-005499 | 1/2021 |
| JP | 2021-507420 | 2/2021 |
| JP | 2021-077125 | 5/2021 |
| JP | 2021-079907 | 5/2021 |
| JP | 2021-144386 | 9/2021 |
| JP | 2022-022684 | 2/2022 |
| JP | 2022-125613 | 8/2022 |
| JP | 2023-074999 | 5/2023 |
| WO | WO2021/149560 | 7/2021 |
| WO | WO 2021/177299 | 9/2021 |

* cited by examiner

*Primary Examiner* — John F Mortell
(74) *Attorney, Agent, or Firm* — MORI & WARD, LLP

(57) ABSTRACT

A light emitting device for emitting a given irradiation light pattern is provided. The light emitting device includes a plurality of light emitting elements configured to be individually turned on. The light emitting device is configured to emit at least one irradiation light pattern onto a road surface in accordance with a detected situation of a traffic object.

23 Claims, 24 Drawing Sheets

LIGHT EMITTING DEVICE AND TRAFFIC SYSTEM

CROSS-REFERENCE TO RELATED APPLICATIONS

The present application claims priority under 35 U.S.C. § 119 to Japanese Patent Application No. 2023-086035, filed May 25, 2023, and Japanese Patent Application No. 2023-216736, filed Dec. 22, 2023, the contents of which are hereby incorporated by reference in their entirety.

BACKGROUND

1. Technical Field

The present disclosure relates to a light emitting device and a traffic system.

2. Description of Related Art

Japanese Patent Publication No. 2022-22684 describes a light emitting device that causes, within an intersection where time-difference-type traffic lights are installed, at least one of an arrow-shaped pattern prompting a driver of his/her own vehicle in an own lane to proceed or a cross-shaped pattern instructing a driver of an oncoming vehicle in the opposite lane to stop to be displayed in a state in which a time-difference-type traffic light on the own lane side is green and a time-difference-type traffic light on the opposite lane side is red.

However, Japanese Patent Publication No. 2022-22684 does not describe that an irradiation light pattern is emitted in accordance with the detected situation of a traffic object such as a vehicle.

SUMMARY

Embodiments of the present disclosure provide a light emitting device and a traffic system in which an irradiation light pattern can be emitted in accordance with the detected situation of a traffic object.

According to an embodiment of the present disclosure, a light emitting device for emitting a given irradiation light pattern is provided. The light emitting device includes a plurality of light emitting elements configured to be individually turned on. The light emitting device is configured to emit at least one irradiation light pattern onto a road surface in accordance with a detected situation of a traffic object.

According to an embodiment of the present disclosure, a traffic system includes a detection device; and a light emitting device including a plurality of light emitting elements configured to be individually turned on. The light emitting device is configured to emit an irradiation light pattern onto a road surface in accordance with a situation of a traffic object. The situation of the traffic object is obtained based on a detection result by the detection device.

BRIEF DESCRIPTION OF THE DRAWINGS

A more complete appreciation of embodiments of the invention and many of the attendant advantages thereof will be readily obtained by reference to the following detailed description when considered in connection with the accompanying drawings.

DETAILED DESCRIPTION

Figure 1:
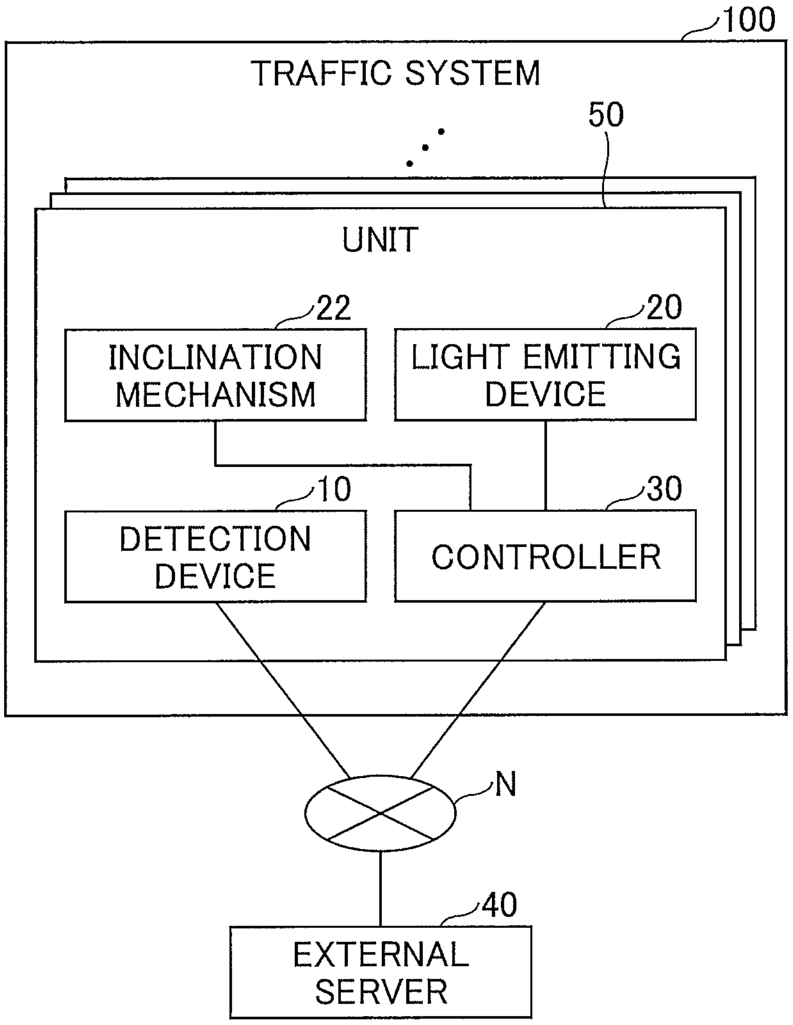
FIG. 1 is a block diagram illustrating a configuration of a traffic system according to an embodiment.

In the following, a light emitting device and a traffic system according to embodiments of the present disclosure will be described in detail with reference to the accompanying drawings. The following embodiments exemplify the light emitting device and the traffic system to give a concrete form to the technical ideas of the present disclosure, but the invention is not limited to the described embodiments. In addition, unless otherwise specified, the dimensions, materials, shapes, relative arrangements, and the like of components described in the embodiments are not intended to limit the scope of the present disclosure thereto, but are described as examples. The sizes, positional relationships, and the like of members illustrated in the drawings may be exaggerated for clearer illustration. Further, in the following description, the same names and reference numerals denote the same or similar members, and a detailed description thereof will be omitted as appropriate.

In the present specification and the claims, if there are multiple components and these components are to be distinguished from one another, the components may be distinguished by adding terms "first", "second", and the like before the names of the components. Further, objects to be distinguished may be different between the specification and the claims. Thus, if a component recited in the claims is denoted by the same reference numeral as that of a component described in the present specification, an object specified by the component recited in the claims may not be identical with an object specified by the component described in the specification.

For example, if components are distinguished by the ordinal numbers "first", "second", and "third" in the specification, and components with "first" and "third" or components with "first" and without a specific ordinal number in the specification are described in the claims, these components may be distinguished by the ordinal numbers "first" and "second" in the claims for ease of understanding. In this case, the components with "first" and "second" in the claims respectively refer to the components with "first" and "third" or the components with "first" and without a specific ordinal number in the specification. This rule is applied not only to components but also other objects in a reasonable and flexible manner.

Overall Configuration of Traffic System 100

Figure 2:
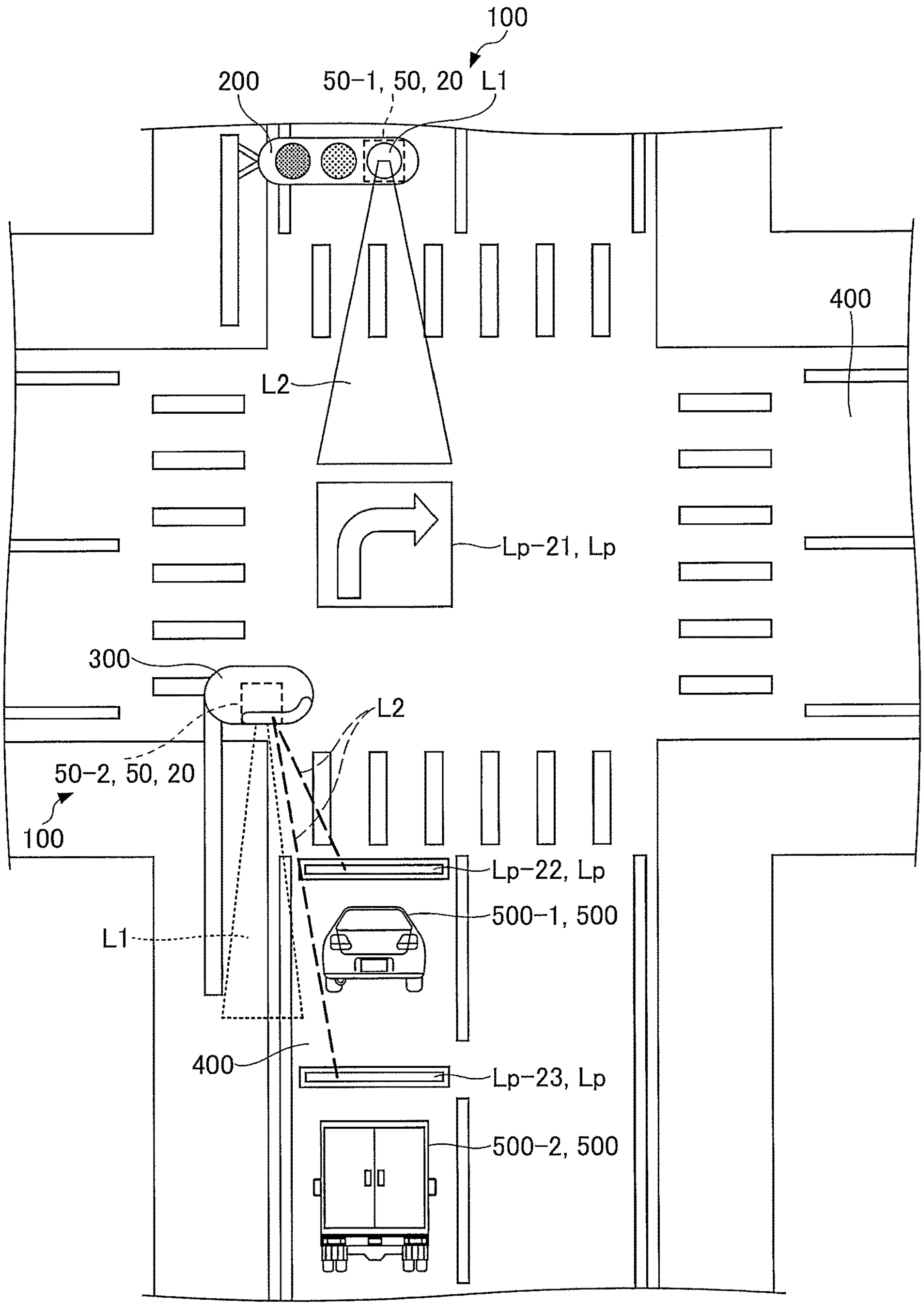
FIG. 2 is a diagram illustrating functions of the traffic system according to the embodiment.
Figure 3:
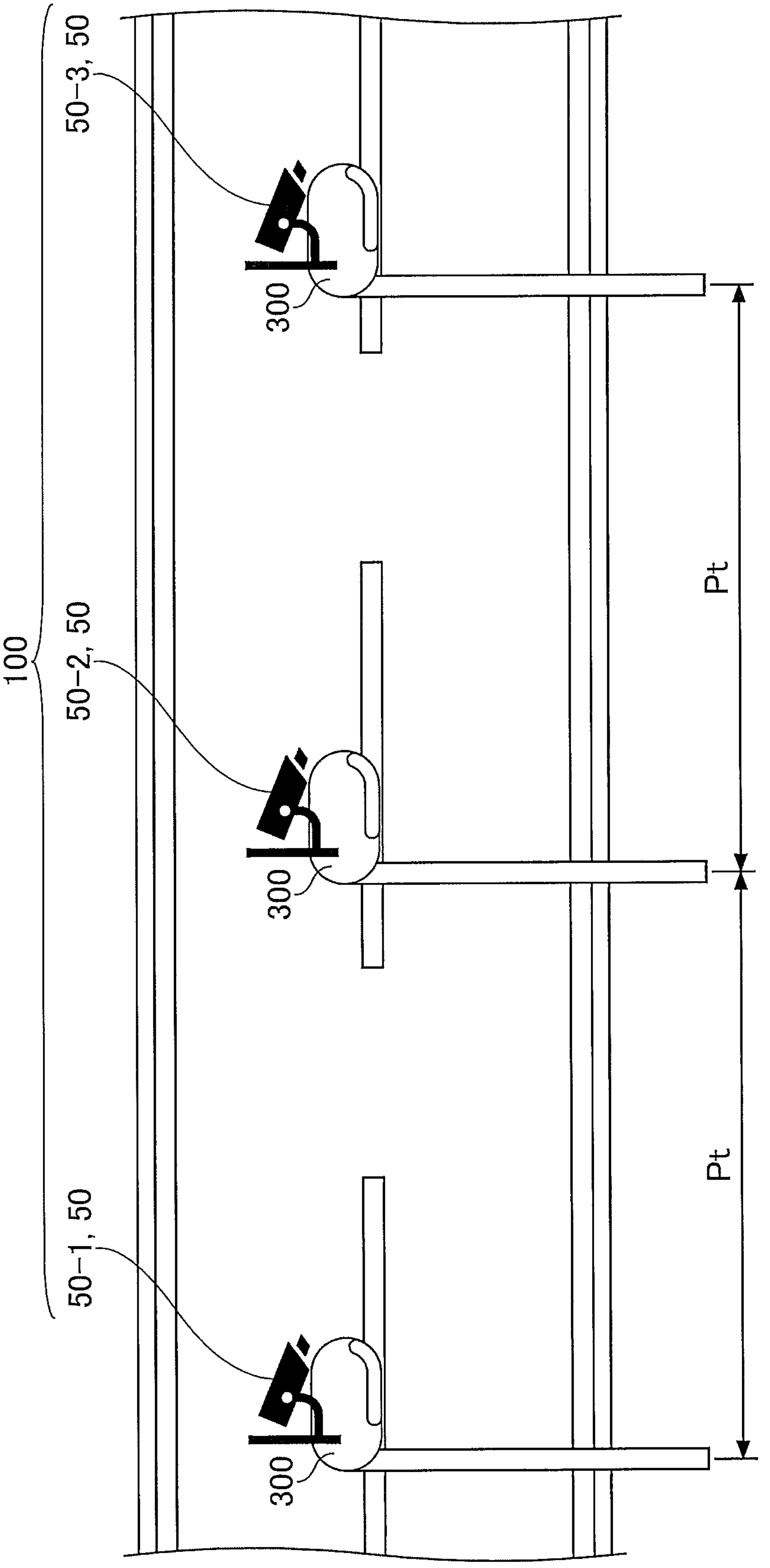
FIG. 3 is a diagram illustrating the arrangement of a plurality of units according to the embodiment.

The overall configuration of a traffic system 100 according to an embodiment will be described with reference to FIG. 1 through FIG. 3. FIG. 1 is a block diagram illustrating an example configuration of the traffic system 100. FIG. 2 is a diagram illustrating functions of the traffic system 100. FIG. 3 is a diagram illustrating an example of the arrangement of a plurality of units (light emitting units) 50 included in the traffic system 100.

As illustrated in FIG. 1, in the present embodiment, the traffic system 100 includes one or more units 50. Each of the one or more units 50 includes a detection device 10, a light emitting device 20, an inclination mechanism 22, and a controller 30. The detection device 10 and the controller 30 included in each of the one or more units 50 are communicably connected to each other. The controller 30 is communicably connected to the light emitting device 20 and the inclination mechanism 22.

In the example illustrated in FIG. 1, a plurality of detection devices 10 and a plurality of controllers 30 are communicably connected to one another via a network N such as the Internet. Further, an external server 40 is connected to the network N so as to communicate with the traffic system 100. The external server 40 can be a server group including one or more servers. Further, the external server 40 can include one or more servers installed in a cloud environment. In addition to the external server 40, a vehicle such as an automobile traveling on a road, a mobile terminal of a pedestrian walking on a road, and the like can be connected to the network N so as to communicate with a detection device 10 and a controller 30 included in the traffic system 100. The detection device 10 can be communicably connected to the controller 30 without the network N.

The detection device 10 is configured to detect information on the situation of a traffic object. As used herein, the "traffic object" refers to an object or a person moving on a road. The traffic object includes a movable object or a non-movable object present in a lane (a traffic zone). Examples of the traffic object according to the present embodiment include a passing vehicle, a passerby, an accident vehicle, a stopped vehicle, an emergency vehicle, and the like. The stopped vehicle includes a passing vehicle that is temporarily stopped at a red light or the like, regardless of whether power such as an engine is in operation. Conversely, the traffic object according to the present embodiment does not include a parked vehicle that is a vehicle parked on a road.

The light emitting device 20 includes a plurality of light emitting elements configured to be individually turned on. The light emitting device 20 is configured to irradiate a road surface with an irradiation light pattern in accordance with the situation of a traffic object. The situation of a traffic object is obtained based on a detection result by the detection device 10.

As illustrated in FIG. 2, in the present embodiment, respective units 50 can be disposed in a traffic light 200 and a street lamp 300. In the example illustrated in FIG. 2, a unit 50-1 of the units 50 is disposed in the traffic light 200. A unit 50-2 of the units 50 is disposed in the street lamp 300. In the example illustrated in FIG. 2, the respective units 50 are disposed in the traffic light 200 and the street lamp 300; however, the configuration is not limited thereto, and a unit 50 can be disposed in the traffic light 200 or the street lamp 300. Further, the units 50 can be disposed on, for example, the wall surface of a building, a roadside tree, and the like other than the traffic light 200 and the street lamp 300.

In the present embodiment, light emitting devices 20 included in the respective units 50 disposed in the traffic light 200 and the street lamp 300 can each be configured to emit primary purpose light L1 and auxiliary light L2. The primary purpose light L1 refers to light emitted from each of the traffic light 200 and the street lamp 300 in order to implement the functions of each of the traffic light 200 and the street lamp 300. The primary purpose light L1 of the traffic light 200 is, for example, green light permitting a vehicle to proceed, red light instructing a vehicle to stop, and yellow light calling attention. The primary purpose light L1 of the street lamp 300 is, for example, light emitted onto a road or a sidewalk so as to secure the visibility of pedestrians and cyclists at night. The auxiliary light L2 is light for assisting or supporting a driver in driving a traffic object, or assisting or supporting walking of a pedestrian. In the present embodiment, the auxiliary light L2 includes an irradiation light pattern Lp in accordance with the situation of a traffic object 500. For example, the auxiliary light L2 is light for displaying a traffic sign. By using the auxiliary light L2 as light for displaying a traffic sign, the traffic sign is displayed on a road surface 400, and thus the drivers of vehicles and pedestrians can easily visually recognize the traffic sign.

In the present embodiment, each of the light emitting devices 20 can emit both the primary purpose light L1 and the auxiliary light L2. Therefore, the configurations of the traffic light 200 and the street lamp 300 can be simplified, as compared to when a light emitting device that emits the primary purpose light L1 and a light emitting device that emits the auxiliary light L2 are separately provided. However, the light emitting devices 20 can be configured to emit the auxiliary light L2 only, and can be configured not to emit the primary purpose light L1.

In FIG. 2, a direction indicator of a traffic object 500-1 is turned on so as to indicate, to the surroundings, that the traffic object 500-1 is to turn right. A detection device 10 disposed in the traffic light 200 detects a situation in which the traffic object 500-1 is to turn right based on the operating state of the direction indicator of the traffic object 500-1. In accordance with the situation detected by the detection device 10, a light emitting device 20 disposed in the traffic light 200 emits, as auxiliary light L2, an irradiation light pattern Lp-21 including an arrow graphic onto the road surface 400 at the center of an intersection. The arrow graphic of the irradiation light pattern Lp-21 indicates that the traffic object 500-1 is to turn right. Accordingly, the drivers of vehicles passing through the intersection and pedestrians in the vicinity of the intersection can visually recognize the irradiation light pattern Lp-21, and thus can recognize that the traffic object 500-1 is to turn right.

Further, in FIG. 2, each of the traffic object 500-1 and a traffic object 500-2 is stopped in accordance with red primary purpose light L1 emitted from the traffic light 200. A detection device 10 disposed in the street lamp 300 detects a situation in that each of the traffic object 500-1 and the traffic object 500-2 is stopped. For the traffic object 500-1 and the traffic object 500-2 detected by the detection device 10, a light emitting device 20 disposed in the street lamp 300 emits, as auxiliary light L2, irradiation light patterns Lp-22 and Lp-23 each including a line graphic, onto the road surface 400 ahead of the traffic objects 500-1 and 500-2 in the traveling direction, in accordance with primary purpose light L1 (for example, yellow or red primary purpose light L1) emitted from the traffic light 200. The line graphic of the irradiation light pattern Lp-22 indicates an appropriate stop position of the traffic object 500-1, and the line graphic of the irradiation light pattern Lp-23 indicates an appropriate stop position of the traffic object 500-2. The appropriate stop position of the traffic object 500-1 is, for example, a position at which contact between the stopped traffic object 500-1 and the stopped traffic object 500-2 can be avoided. The drivers of the traffic objects 500-1 and 500-2 can visually recognize the irradiation light patterns Lp-22 and Lp-23, respectively, and thus can recognize the appropriate stop positions of the traffic objects 500-1 and 500-2.

The emission color of primary purpose light L1 can be the same as or different from the emission color of auxiliary light L2. For example, in the present embodiment as illustrated in FIG. 2, in the light emitting device 20 disposed in the traffic light 200, the primary purpose light L1 can be light of a first emission color (for example, red light), and background light of the auxiliary light L2 can be light of a second emission color (for example, blue light) and the arrow pattern can be light of a third emission color (for example, white light).

The inclination mechanism 22 is used to change the distance between a traffic object 500 and a region irradiated with an irradiation light pattern Lp. The functions of the inclination mechanism 22 will be separately described in detail with reference to FIG. 9 and FIG. 10.

As described above, in the present embodiment, the light emitting device 20 and the traffic system 100, in which an irradiation light pattern can be emitted in accordance with the detected situation of a traffic object 500, can be provided. The traffic system 100 can achieve high-safety traffic, smooth traffic, and the like by using auxiliary light L2 emitted from the light emitting device 20.

Further, in the present embodiment, as illustrated in FIG. 3, a plurality of units 50 can be arranged at predetermined intervals Pt on a road. In the example illustrated in FIG. 3, the plurality of units 50 include units 50-1 to 50-3. The units 50-1 to 50-3 are disposed in respective street lamps 300 arranged at the predetermined intervals Pt. Thus, the units 50-1 to 50-3 are arranged at the predetermined intervals Pt on the road. For example, by arranging the plurality of units 50 at the predetermined intervals Pt on the road in a predetermined section, large deviation does not occur in the positional relationship between traffic objects 500 and the units 50. Therefore, the traffic system 100 can easily control detection by detection devices 10 or irradiation by light emitting devices 20.

The number of the plurality of units 50 is not limited to three illustrated in FIG. 3, and can be any number. The arrangement of the plurality of units 50 is not limited to one-dimensional arrangement illustrated in FIG. 3, and the plurality of units 50 can be two-dimensionally arranged. If the plurality of units 50 are two-dimensionally arranged, the plurality of units 50 can be arranged at the predetermined intervals pt in each of two directions substantially orthogonal to each other. However, the plurality of units 50 are not necessarily arranged at the predetermined intervals Pt on the road. Even if the plurality of units 50 are arranged at any intervals, the light emitting devices 20 and the traffic system 100, in which an irradiation light pattern can be emitted in accordance with the detected situation of a traffic object 500 can be provided.

Example Configuration of Detection Device 10

Figure 4:
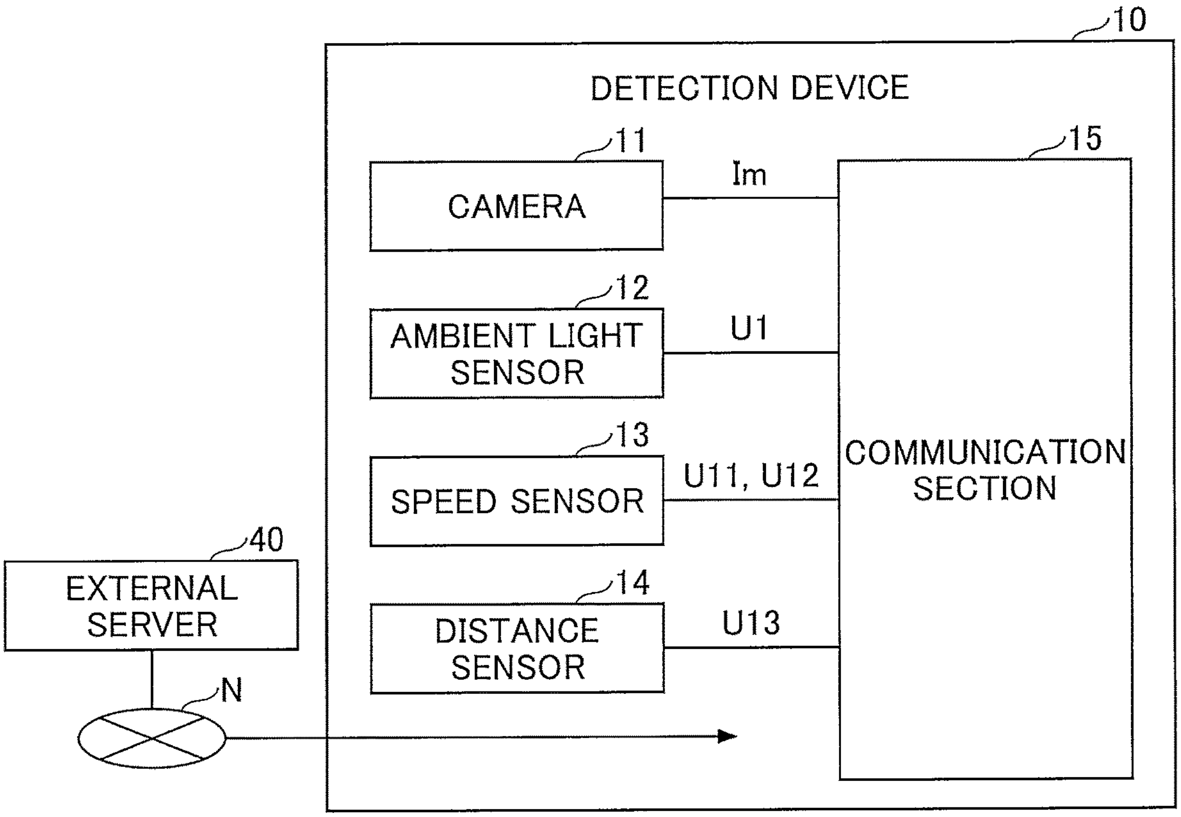
FIG. 4 is a block diagram illustrating a configuration of a detection device according to the embodiment.

FIG. 4 is a block diagram illustrating an example configuration of a detection device 10. In the present embodiment, the detection device 10 includes a camera 11, an ambient light sensor 12, a speed sensor 13, a distance sensor 14, and a communication section 15. The detection device 10 can include at least one selected from the group consisting of the camera 11, the ambient light sensor 12, the speed sensor 13, the distance sensor 14, and the communication section 15 according to a detection target or the like.

The camera 11 includes an optical member such as a lens and an imaging element such as a charge-coupled device (CCD) or a complementary metal oxide semiconductor (CMOS). The camera 11 captures an image of a traffic object or an image of the surroundings of the traffic object, and outputs the captured image Im to the communication section 15.

The ambient light sensor 12 detects the brightness of the surroundings of the detection device 10, and outputs ambient light information U1, which is information on the detected brightness, to the communication section 15. For the ambient light sensor 12, an illuminance sensor or the like can be used that detects the brightness of the surroundings by using illuminance as a detection value.

The speed sensor 13 detects the speed of each traffic object traveling on a road, and outputs traveling speed information U11 and following-vehicle speed information U12 to the communication section 15. The traveling speed information U11 is information on the speed of a preceding vehicle. The following-vehicle speed information U12 is information on the speed of a following vehicle that follows the preceding vehicle. The speed sensor 13 can be of a type that utilizes the Doppler effect or a type that utilizes a spatial filter.

The distance sensor 14 detects the distance between traffic objects traveling on a road. For example, the distance sensor 14 outputs inter-vehicle distance information U13, which is the distance between a preceding vehicle and a following vehicle, to the communication section 15. For the distance sensor 14, a stereo camera, a light detection and ranging (LiDAR) device, or the like can be used.

The communication section 15 can communicate with devices other than the detection device 10. The devices other than the detection device 10 are the controller 30, the external server 40, and the like. The communication section 15 receives, as inputs, a captured image Im from the camera 11, ambient light information U1 from the ambient light sensor 12, speed information V from the speed sensor 13, and distance information L from the distance sensor 14. Further, the communication section 15 can receive various information from the external server 40 via the network N. The communication section 15 can transmit the information acquired from the camera 11, the ambient light sensor 12, the speed sensor 13, the distance sensor 14, and the external server 40 to the controller 30 or the like via the network N or the like illustrated in FIG. 1.

Example Hardware Configuration of Communication Section 15

Figure 5:
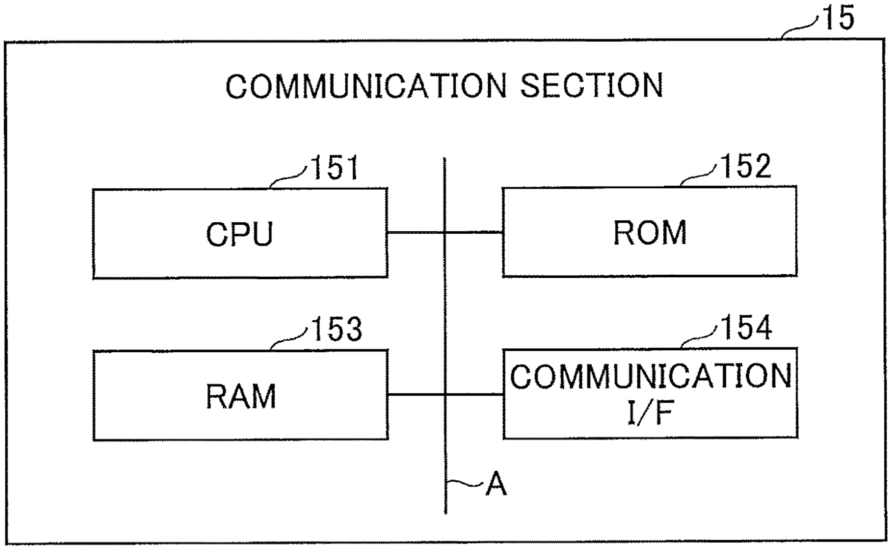
FIG. 5 is a block diagram illustrating a hardware configuration of a communication section according to the embodiment.

FIG. 5 is a block diagram illustrating an example hardware configuration of the communication section 15. In FIG. 5, the communication section 15 is comprised of, for example, a computer. The communication section 15 includes a central processing unit (CPU) 151, a read only memory (ROM) 152, and a random access memory (RAM) 153. In addition, the communication section 15 includes a communication interface (I/F) 154. The above components are communicably connected to one another via a system bus A.

The CPU 151 executes control processing including various kinds of arithmetic processing. The ROM 152 stores programs, such as an initial program loader (IPL), used to drive the CPU 151. The RAM 153 is used as a work area for the CPU 151.

The communication I/F 154 is an interface for communication between the communication section 15 and equipment or devices other than the communication section 15. The communication I/F 154 can communicate with equipment or devices other than the communication section 15 via the network N or the like. Examples of the equipment other than the communication section 15 include the camera 11, the ambient light sensor 12, the speed sensor 13, the distance sensor 14, and the like. Examples of the devices other than the communication section 15 include the controller 30, the external server 40, and the like.

Example Functional Configuration of Communication Section 15

Figure 6:
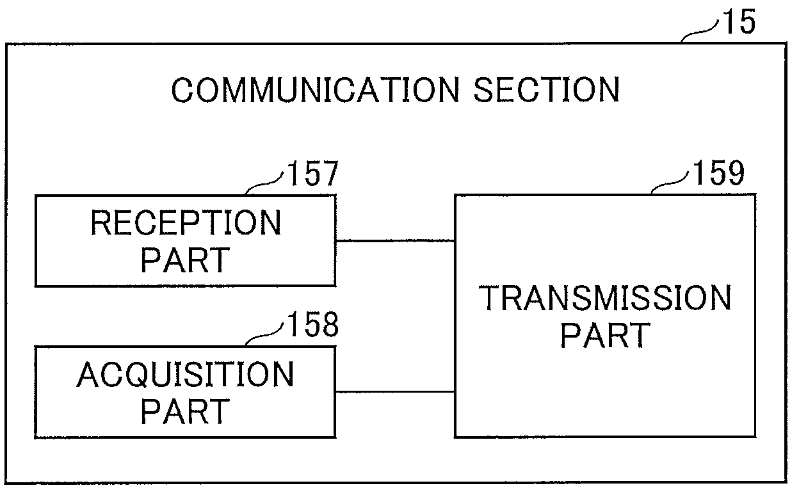
FIG. 6 is a block diagram illustrating a functional configuration of the communication section according to the embodiment.

FIG. 6 is a block diagram illustrating an example functional configuration of the communication section 15. As illustrated in FIG. 6, the communication section 15 includes a reception part 157, an acquisition part 158, and a transmission part 159. The functions of the reception part 157, the acquisition part 158, and the transmission part 159 are implemented by the communication I/F 154 and the like. Some of the functions of the reception part 157, the acquisition part 158, and the transmission part 159 can be implemented by causing a processor such as the CPU 151 to execute processing defined in a program stored in the ROM 152.

The reception part 157 receives various information from the external server 40 by controlling communication with the external server 40 via the network N. The reception part 157 outputs the received information to the transmission part 159.

The acquisition part 158 acquires a captured image Im from the camera 11 by controlling communication between the communication section 15 and the camera 11. Further, the acquisition part 158 acquires ambient light information U1 from the ambient light sensor 12 by controlling communication between the communication section 15 and the ambient light sensor 12. Further, the acquisition part 158 acquires speed information V from the speed sensor 13 by controlling communication between the communication section 15 and the speed sensor 13. Further, the acquisition part 158 acquires distance information L from the distance sensor 14 by controlling communication between the communication section 15 and the distance sensor 14. The acquisition part 158 outputs the acquired information to the transmission part 159.

The transmission part 159 transmits the information, received from each of the reception part 157 and the acquisition part 158, to the controller 30 via the network N or the like by controlling communication with the controller 30 via the network N.

Example Configuration of Periphery of Light Emitting Device 20

Figure 7:
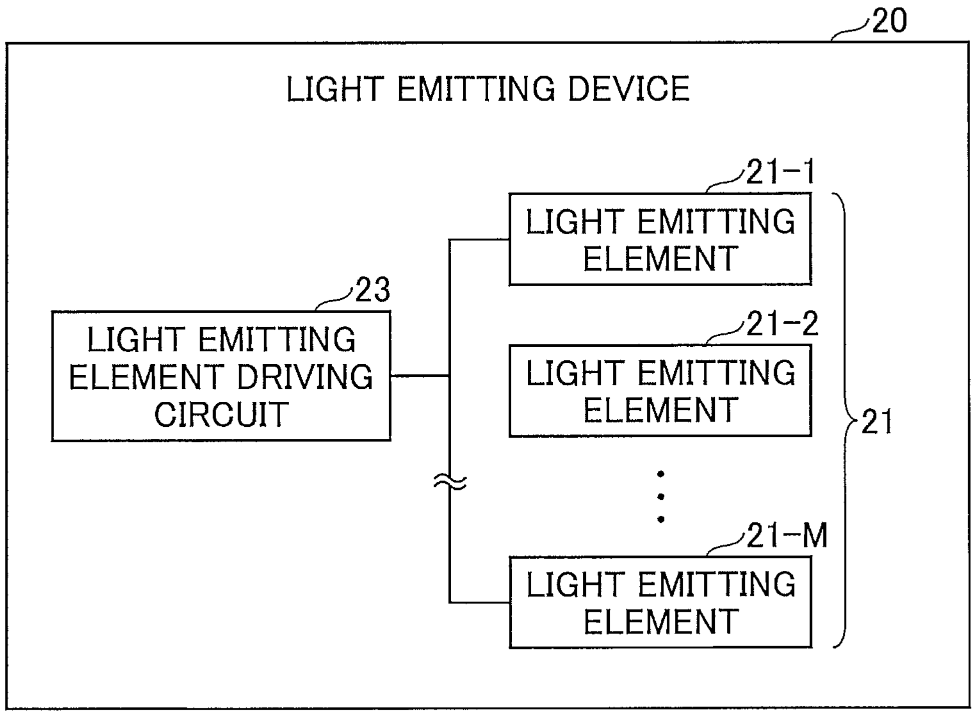
FIG. 7 is a block diagram illustrating a configuration of the periphery of a light emitting device according to the embodiment.
Figure 8:
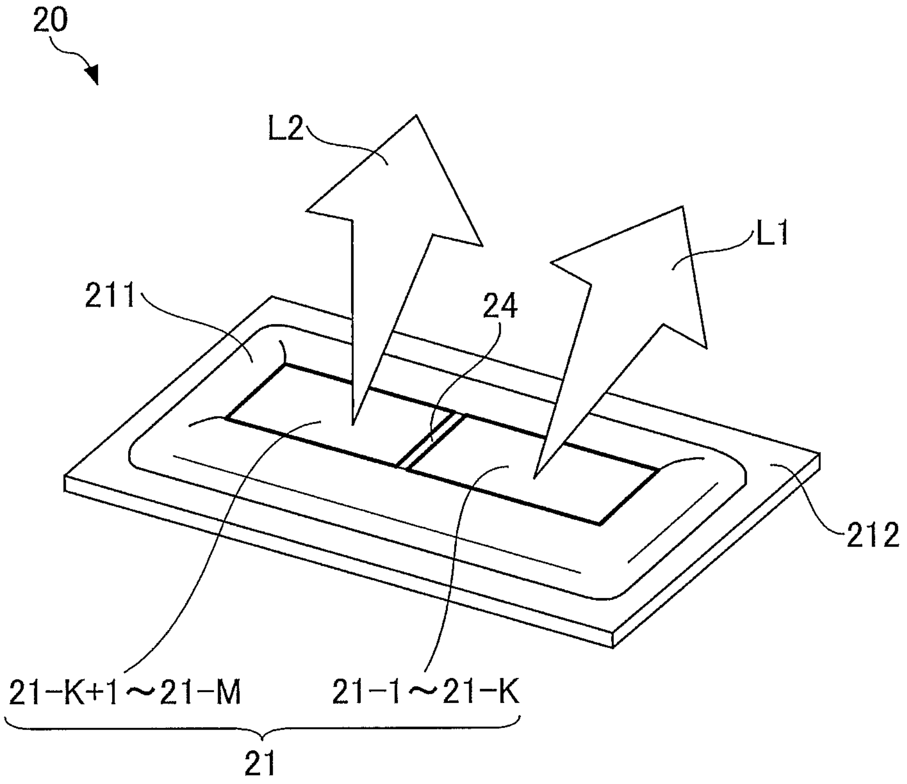
FIG. 8 is a perspective view schematically illustrating the light emitting device according to the embodiment.
Figure 9:
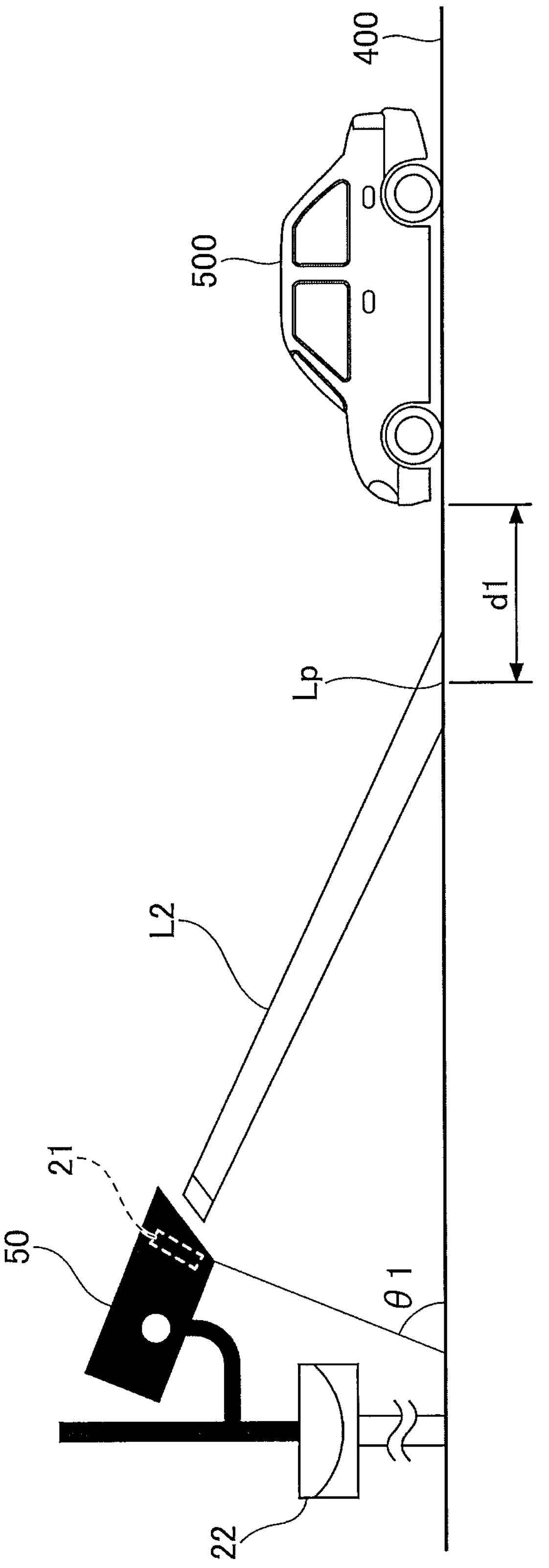
FIG. 9 is a diagram schematically illustrating a configuration of an inclination mechanism according to the embodiment.
Figure 10:
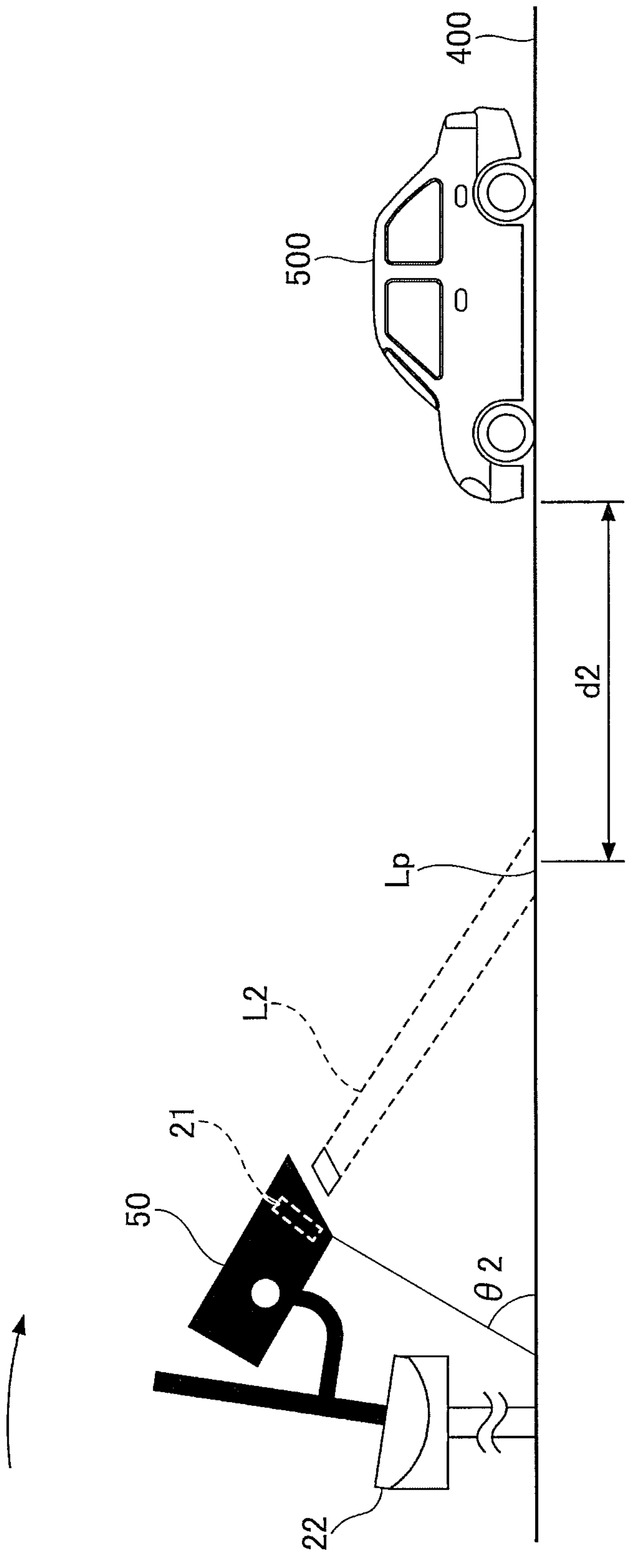
FIG. 10 is a diagram schematically illustrating an inclination operation of the inclination mechanism according to the embodiment.

A configuration of the periphery of a light emitting device 20 will be described with reference to FIG. 7 through FIG. 10. FIG. 7 is a block diagram illustrating an example configuration of the light emitting device 20. FIG. 8 is a perspective view schematically illustrating an example of the light emitting device 20. FIG. 9 is a diagram schematically illustrating an example configuration of the inclination mechanism 22. FIG. 10 is a diagram schematically illustrating an example of an inclination operation of the inclination mechanism 22.

As illustrated in FIG. 7, in the present embodiment, the light emitting device 20 includes a plurality of light emitting elements 21 configured to be individually turned on, and a light emitting element driving circuit 23. As illustrated in FIG. 2, the light emitting device 20 can emit a given irradiation light pattern Lp. In the present embodiment, the light emitting device 20 can irradiate the road surface 400 with an irradiation light pattern Lp in accordance with the detected situation of a traffic object. The light emitting device 20 can include one of the inclination mechanism 22 and the controller 30, or can include both the inclination mechanism 22 and the controller 30.

The plurality of light emitting elements 21 include a light emitting elements 21-1, a light emitting elements 21-2, . . . , and a light emitting element 21-M, where M is a natural number representing the number of the plurality of light emitting elements 21. The plurality of light emitting elements 21 include, for example, a plurality of LEDs arranged one dimensionally or two dimensionally. The plurality of LEDs can be individually driven and turned on.

The light emitting element driving circuit 23 is an electric circuit or an electronic circuit that can individually drive the plurality of light emitting elements 21.

In FIG. 8, a frame body 211 is a member that surrounds the plurality of light emitting elements 21 in a plan view, and reflects light from each of the light emitting elements 21 upward, for example. The frame body 211 is, for example, a white member. A mounting substrate 212 is a substrate on which the plurality of light emitting elements 21 are mounted. In the example illustrated in FIG. 8, light emitting elements 21-1 to 21-K among the plurality of light emitting elements 21 emit primary purpose light L1. Further, light emitting elements 21-K+1 to 21-M among the plurality of light emitting elements 21 emit auxiliary light L2. K is a natural number smaller than M. The frame body 211 can be a black member. If the frame body 211 is a black member, stray light of the light emitted from the light emitting elements 21 can be absorbed by the frame body 211. Accordingly, unintended stray light is less likely to travel upward (toward the light extraction side), and thus the light emitting device in which light scattering is suppressed can be obtained. In addition, in the light emitting device 20, the amount of stray light is reduced. Thus, when the light emitting device 20 is used in combination with a lens, the optical design of the lens can be easily made.

Further, as illustrated in FIG. 8, a gap 24 can be provided between the light emitting elements 21-1 to 21-K that emit the primary purpose light L1 and the light emitting elements 21-K+1 to 21-M that emit the auxiliary light L2. Further, a member that reflects light or a member that absorbs light can be provided in the gap 24. With this configuration, interference between the primary purpose light L1 and the auxiliary light L2 can be reduced. The plurality of light emitting elements 21 can be arranged without providing the gap 24 between the light emitting elements 21-1 to 21-K that emit the primary purpose light L1 and the light emitting elements 21-K+1 to 21-M that emit the auxiliary light L2. Further, the light emitting elements 21-K+1 to 21-M that emit the auxiliary light L2 can be divided into a plurality of groups. Accordingly, for example, if one light emitting device emits irradiation light patterns in accordance with the situations of a plurality of respective traffic objects, a first group of light emitting elements, among the light emitting elements 21-K+1 to 21-M that emit the auxiliary light L2, can emit an irradiation light pattern for a first traffic object, and a second group of light emitting elements, among the light emitting elements 21-K+1 to 21-M that emit the auxiliary light L2, can emit an irradiation light pattern for a second traffic object. Further, the structure, the arrangement pitch, and the like of the light emitting elements 21-1 to 21-K that emit the primary purpose light L1 can be different from those of the light emitting elements 21-K+1 to 21-M that emit the auxiliary light L2.

As the plurality of light emitting elements 21, a light emitting diode (LED) array can be used, for example. The LED array includes a plurality of LEDs arranged one-dimensionally or two-dimensionally, and can cause the plurality of LED to be individually driven and turned on. The LED array includes, for example, 100 or more and 2,000,000 or less light emitting elements, preferably 1,000 or more and 500,000 or less light emitting elements, and more preferably 3,000 or more and 150,000 or less light emitting elements, and can emit various irradiation light patterns. By causing the LED array to include 100 or more light emitting elements, if the light emitting device 20 is used for road surface projection and the like, road surface projection including simple messaging and the like can be performed. Further, by causing the LED array to include 2,000,000 or less light emitting elements, a high-definition road surface projection can be achieved while reducing the size of the light emitting device 20, and light with sufficient illuminance can be emitted when the light emitting elements 21 are individually turned on. The light emitting elements 21 can have a rectangle shape in a plan view, and for example, the long side of each of the light emitting elements 21 is 10 μm or more and 100 μm or less, and preferably 15 μm or more and 50 μm or less. Further, the distance between adjacent ones of the plurality of light emitting elements 21 is, for example, 4 μm or more and 15 μm or less. The LED array is used in applications such as road surface projection. The plurality of light emitting elements 21 can emit the auxiliary light L2 that includes an irradiation light pattern Lp onto the road surface 400 by being individually driven and turned on. The light emitting device 20 can cause light emitting elements to be driven and turned on for each group. The plurality of light emitting elements 21 can emit an irradiation light pattern Lp onto the road surface 400 through an optical member such as a lens.

Further, in the present embodiment, the light emitting device 20 can change the distance between a traffic object 500 and a region irradiated with an irradiation light pattern Lp based on at least one of information on the type of the traffic object 500, including vehicle height information of the traffic object 500, and information on the eye level of the driver of the traffic object 500. The eye level can also be referred to as the position of the eyes of the driver in the height direction.

As illustrated in FIG. 9 and FIG. 10, the inclination mechanism 22 is used to change the distance between a traffic object 500 and a region irradiated with an irradiation light pattern Lp. In the example illustrated in FIG. 9 and FIG. 10, the inclination mechanism 22 is driven by a drive unit such as a motor, and can change the inclination angle of a unit 50. The inclination angle is an angle between the light emitting surface of the light emitting device 20 and the road surface 400. By changing the inclination angle, the inclination mechanism 22 can change the position of the irradiation light pattern Lp emitted onto the road surface 400 from the plurality of light emitting elements 21.

In FIG. 9, auxiliary light L2 emitted from the plurality of light emitting elements 21 includes the irradiation light pattern Lp. The distance between the approximate center position of the irradiation light pattern Lp and the front end of the traffic object 500 in the traveling direction of the traffic object 500 is d1, and an inclination angle is θ1. Conversely, FIG. 10 differs from FIG. 9 in that the inclination angle θ1 is changed to an inclination angle θ2 by the inclination mechanism 22. By changing the inclination angle, the irradiation direction of the auxiliary light L2 from the plurality of light emitting elements 21 changes, and the position of the irradiation light pattern Lp emitted onto the road surface 400 changes. In FIG. 10, the distance between the approximate center position of the irradiation light pattern Lp and the front end of the traffic object 500 in the traveling direction of the traffic object 500 is d2. The distance d2 is longer than the distance d1.

For example, the eye level of the driver of the traffic object 500 changes according to the height of the traffic object 500, the height of the driver of the traffic object 500, or the like, and as a result, the position of the irradiation light pattern Lp that can be easily visually recognized by the driver can change. Specifically, in FIG. 9, if the eye level of the driver is high, the driver can visually recognize the irradiation light pattern Lp emitted at a position at the distance d1 from the traffic object 500 by looking down on the irradiation light pattern Lp. However, if the eye level of the driver is low because the seated height of the driver is low or the height of the traffic object 500 is low, the irradiation light pattern Lp emitted at a position close to and ahead of the traffic object 500 would be hidden by the front end of the traffic object 500, and thus the driver would be unable to visually recognize the irradiation light pattern Lp. In such a case, as illustrated in FIG. 10, the light emitting device 20 can emit the irradiation light pattern Lp at a position away from the traffic object 500 by the distance d2 that is longer than the distance d1. Accordingly, the driver can easily visually recognize the irradiation light pattern Lp.

The eye level of the driver can be detected based on, for example, an image of the eyes of the driver captured by a camera disposed inside the traffic object 500 and height information on the height of the position of the camera. However, the eye level of the driver can be detected by other methods. For example, the types of traffic objects 500 are determined based on the colors of license plates of the traffic objects 500, numbers and characters displayed on the license plates, the shapes of the traffic objects 500, and the like, and the eye levels of drivers are set in accordance with the types of the traffic objects 500 in advance. Then, information on the set eye levels are stored in the detection device 10, the external server 40, or the like. Then, by using the information, the eye level of the driver of a detected traffic object 500 can be determined in accordance with the type of the traffic object 500.

The configuration for changing the distance between the traffic object 500 and the region irradiated with the irradiation light pattern Lp is not limited to the inclination mechanism 22 that inclines the unit 50. For example, the traffic system 100 can change the above distance by inclining only the light emitting device 20 without inclining the unit 50. Alternatively, the traffic system 100 can change the above distance by inclining the plurality of light emitting elements 21 without inclining the light emitting device 20 itself. If the light emitting device 20 emits the irradiation light pattern Lp through an optical member such as a lens, the traffic system 100 can change the above distance by changing the relative position or the relative angle of the optical member with respect to the plurality of light emitting elements 21.

Further, by using the inclination mechanism 22, the light emitting device 20 can change the position of the irradiation light pattern emitted onto the road surface 400 in accordance with the traveling speed of the traffic object. Thus, the driver can easily visually recognize the irradiation light pattern Lp in accordance with the traveling speed of the traffic object.

In FIG. 9, the controller 30 controls the driving of the plurality of light emitting elements 21 such that the irradiation light pattern Lp is emitted onto the road surface 400 in accordance with the detected situation of the traffic object. The light emitting device 20 emits the irradiation light pattern Lp onto the road surface 400 in accordance with the situation of the traffic object, detected by the detection device 10.

Table 1 below indicates a list of information on the situations of traffic objects, detected by the detection device 10. In the following, if various kinds of information on the situations of traffic objects are not distinguished, the various kinds of information are collectively referred to as traffic object situation information U.

TABLE 1

| SYMBOL | TRAFFIC OBJECT SITUATION INFORMATION U | DETECTOR |
|---|---|---|
| U1 | AMBIENT LIGHT INFORMATION | AMBIENT LIGHT SENSOR |
| U2 | TRAFFIC OBJECT TYPE INFORMATION | CAMERA |
| U3 | PLANNED RIGHT/LEFT TURN INFORMATION | CAMERA |
| U4 | PEDESTRIAN PRESENCE INFORMATION | CAMERA |
| U5 | EMERGENCY VEHICPATH INFORMATION | CAMERA |
| U6 | AREA DEFINITION INFORMATION | CAMERA |
| U7 | EMERGENCY VEHICLE APPROACH INFORMATION | CAMERA |
| U8 | GUIDANCE PATH INFORMATION | CAMERA |
| U9 | ACCIDENT VEHICLE INFORMATION | CAMERA |
| U10 | EYE LEVEL INFORMATION | CAMERA |
| U11 | TRAVEL SPEED INFORMATION | SPEED SENSOR |
| U12 | FOLLOWING - VEHICLE SPEED INFORMATION | SPEED SENSOR |
| U13 | INTER - VEHICLE DISTANCE INFORMATION | DISTANCE SENSOR |
| U14 | REFERENCE SPEED INFORMATION | EXTERNAL SERVER |
| U15 | TRAFFIC RULE INFORMATION | EXTERNAL SERVER |
| U16 | STREETCAR APPROACH INFORMATION | EXTERNAL SERVER |
| U17 | AUTONOMOUS DRIVING FUNCTION INFORMATION | EXTERNAL SERVER |

In Table 1, "symbol" corresponds to a symbol used to represent each piece of information in the drawings. A "detector" is an example of an information source that provides a detection result based on which traffic object situation information U is acquired. The "detector" corresponds to any one of the camera 11, the ambient light sensor 12, the speed sensor 13, the distance sensor 14, and the external server 40. The "detector" is not limited to any of the detectors listed in Table 1.

In Table 1, ambient light information U1 is information on the brightness of the surroundings of the detection device 10 acquired by the ambient light sensor 12 as described above. Traffic object type information U2 is information on the type of a traffic object. Examples of the type of the traffic object includes a large-sized vehicle such as a truck, a standard-sized vehicle such as a standard-sized passenger vehicle, an emergency vehicle, a special vehicle, and the like. Examples of the emergency vehicle include an ambulance and a fire truck. Planned right/left turn information U3 is information on the presence of a vehicle that is to turn right or left. Pedestrian presence information U4 is information on the presence of a pedestrian at a location toward which the traffic object is to proceed.

Emergency vehicle path information U5 is information for presenting a path along which an emergency vehicle can travel in an emergency on a road. Area definition information U6 is information used to define an area where an emergency vehicle travels in an emergency and an area where a traffic object travels. The area where the traffic object travels is, for example, an area where the traffic object can slow down or temporarily stop without interfering with the emergency vehicle in an emergency. Emergency vehicle approach information U7 is information on the approach of an emergency vehicle such as an ambulance and a fire truck. Guidance path information U8 is information used to present the presence of an accident vehicle and to guide a traffic object to a path along which the traffic object can travel while avoiding the accident vehicle. Accident vehicle information U9 is information on the position of an accident vehicle. Eye level information U10 is information on the eye level of the driver of a traffic object.

The traffic object type information U2, the planned right/left turn information U3, the pedestrian presence information U4, the emergency vehicle path information U5, the Area definition information U6, the guidance path information U8, the emergency vehicle approach information U7, and the accident vehicle information U9 are acquired based on captured images Im and the like by the camera 11. However, the emergency vehicle path information U5 and the area definition information U6 can be acquired by being received from the external server 40 via the Internet N.

Traveling speed information U11 is information on the traveling speed of a traffic object, acquired by the speed sensor 13 as described above. Following-vehicle speed information U12 is information on the speed of a following vehicle, acquired by the speed sensor 13 as described above. The traveling speed information U11 and the following-vehicle speed information U12 are acquired by the speed sensor 13. Inter-vehicle distance information U13 is information on the inter-vehicle distance that is the distance between a preceding vehicle and a following vehicle, acquired by the distance sensor 14 or the like as described above. The inter-vehicle distance information U13 is acquired by the distance sensor 14, the camera 11, or the like.

Reference speed information U14 includes legal speed information determined by law on a per-traffic-object type basis, and maximum speed information and minimum speed information that are set for a road. Traffic rule information U15 is information on traffic rules. The traffic rule information U15 is, for example, information on a traffic rule that prohibits entry into an intersection or a corner near a position where the detection device 10 is disposed. The term "corner" in the present embodiment includes a crossroad (road). Streetcar approach information U16 is information on the approach of a streetcar to a position where the detection device 10 is disposed. Autonomous driving function information U17 is information on an autonomous driving function of a vehicle such as automobile, and is, for example, information determined for each autonomous driving level. The reference speed information U14, the traffic rule information U15, the streetcar approach information U16, and the autonomous driving function information U17 are acquired by being received from the external server 40 via the network N. However, the reference speed information U14, the traffic rule information U15, and the autonomous driving function information U17 can be, for example, stored in the detection device 10 or the like in advance, instead of being received from the external server 40. Further, the streetcar approach information U16 can be acquired from the camera 11 or the like. For example, the streetcar approach information U16 is acquired based on information on the current travel position or the planned travel position of the streetcar, which is disclosed on the Internet.

Example Hardware Configuration of Controller 30

Figure 11:
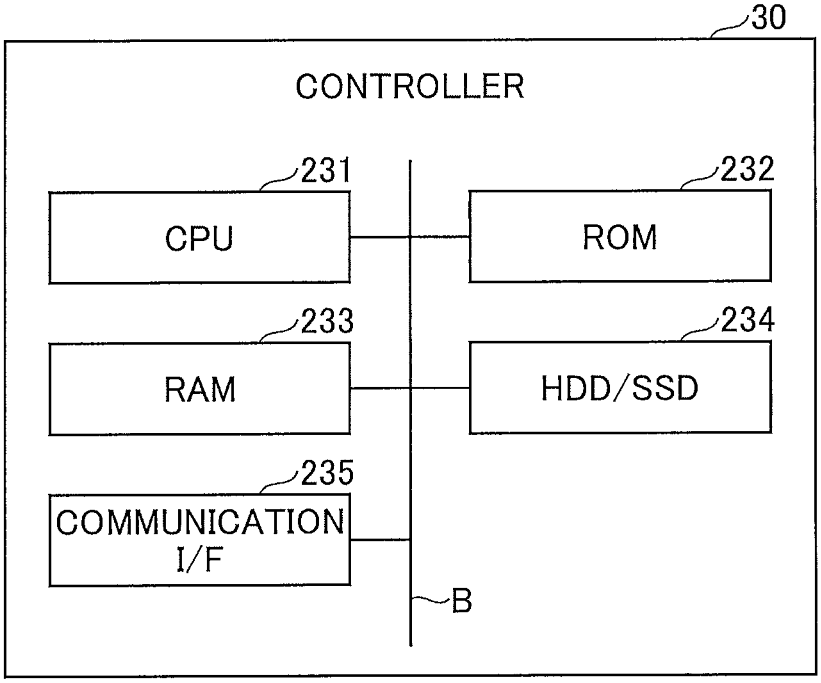
FIG. 11 is a block diagram illustrating a hardware configuration of a controller according to the embodiment.

Next, FIG. 11 is a block diagram illustrating an example hardware configuration of the controller 30. The controller 30 is comprised of, for example, a computer. The controller 30 includes a CPU 231, a ROM 232, a RAM 233, a hard disk drive/solid state drive (HDD/SSD) 234, and a communication I/F 235. The above components are communicably connected to one another via a system bus B.

The CPU 231 executes control processing including various kinds of arithmetic processing. The ROM 232 stores programs, such as an IPL, used to drive the CPU 231. The RAM 233 is used as a work area for the CPU 231. The HDD/SSD 234 can store programs, information transmitted from the detection device 10 or the external server 40, and the like.

The communication I/F 235 is an interface for communicably connecting the controller 30 to the light emitting device 20, the drive unit of the inclination mechanism 22, and the like. Further, the communication I/F 235 can communicate with detection device 10 and the external server 40 via the network N or the like. The controller 30 can output a drive signal of each of the plurality of light emitting elements 21 and the drive unit of the inclination mechanism 22 via the communication I/F 235.

Example Functional Configuration of Controller 30

Figure 12:
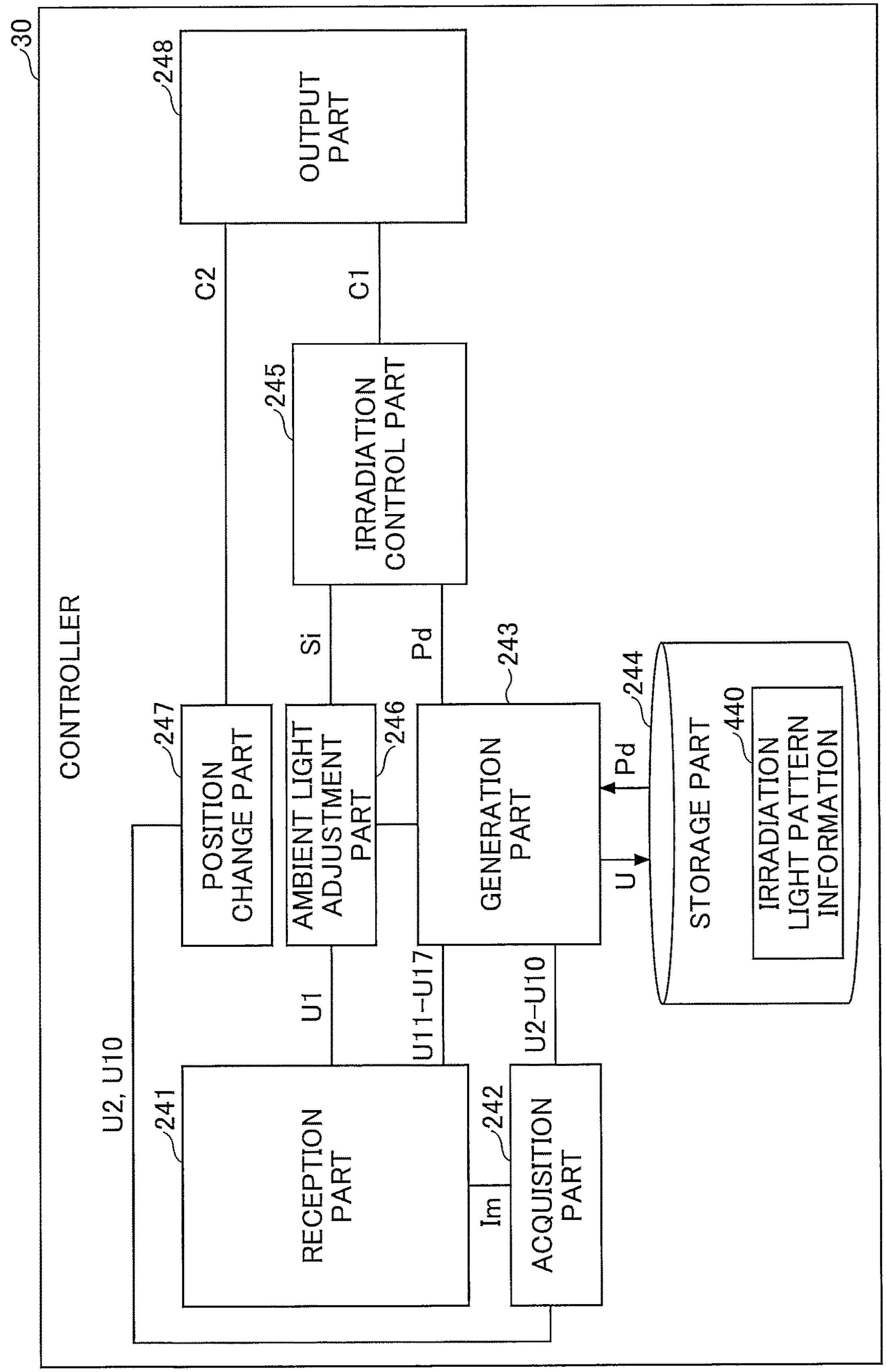
FIG. 12 is a block diagram illustrating a functional configuration of the controller according to the embodiment.
Figure 13:
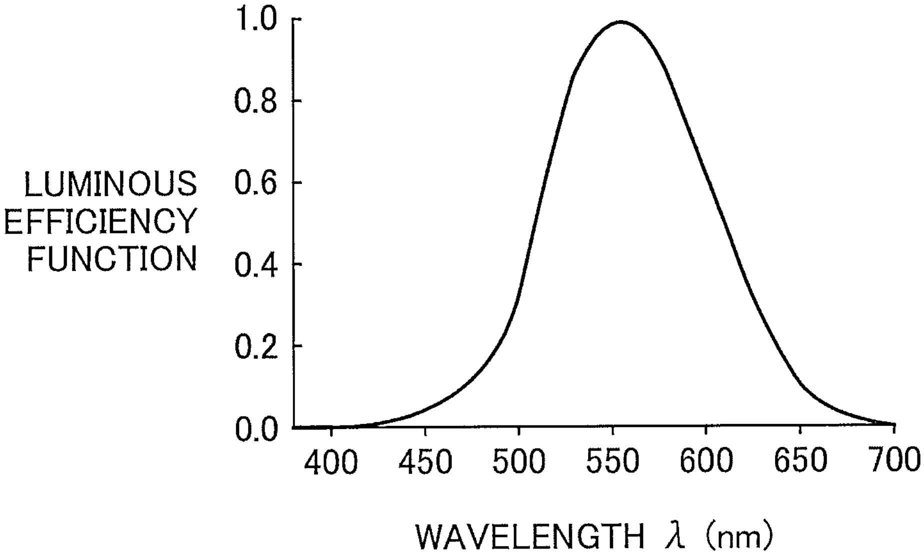
FIG. 13 is a diagram illustrating an example of a luminosity curve for photopic vision.
Figure 14:
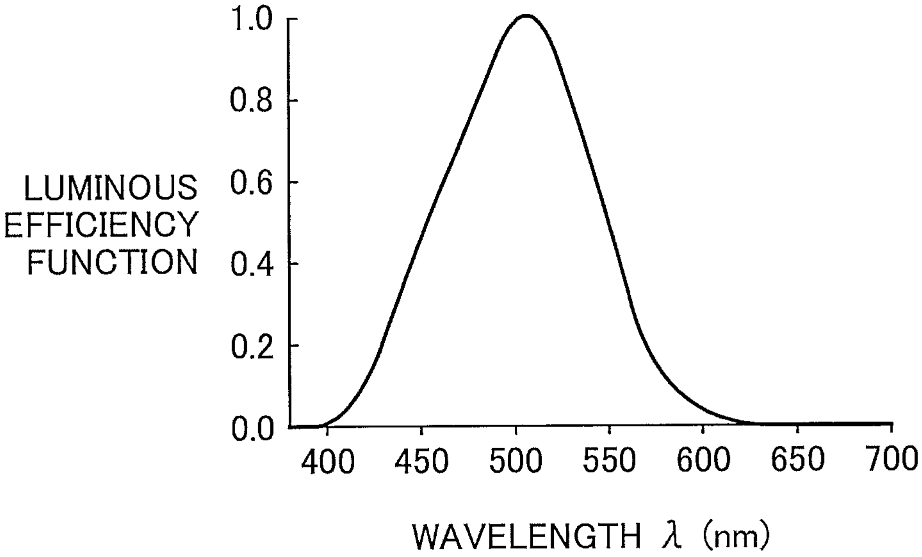
FIG. 14 is a diagram illustrating an example of a luminosity curve for scotopic vision.

A functional configuration of the controller 30 will be described with reference to FIG. 12 through FIG. 14. FIG. 12 is a block diagram illustrating an example functional configuration of the controller 30. FIG. 13 is a diagram illustrating an example of photopic luminosity used in the controller 30. FIG. 14 is a diagram illustrating an example of the scotopic luminosity used in the controller 30.

As illustrated in FIG. 12, the controller 30 includes a reception part 241, an acquisition part 242, a generation part 243, a storage part 244, an irradiation control part 245, an ambient light adjustment part 246, a position change part 247, and an output part 248.

The functions of the output part 248 and the reception part 241 are implemented by the communication I/F 235 and the like. The functions of the storage part 244 are implemented by a non-volatile memory such as the HDD/SSD 234. The functions of the acquisition part 242, the generation part 243, the irradiation control part 245, the ambient light adjustment part 246, and the position change part 247 are implemented by causing a processor such as the CPU 231 to execute processing defined in a program stored in a non-volatile memory such as the ROM 232.

Some of the above functions of the controller 30 can be implemented by the detection device 10, the external server 40, or the like. For example, at least some of the functions of the acquisition part 242 can be provided by the acquisition part 158 of the communication section 15 of the detection device 10. Further, some of the above functions can be implemented by distributed processing between the controller 30 and the detection device 10, the external server 40, or the like. Further, some of the above functions can be implemented by one or more processing circuits. Example of the one or more processing circuits include application-specific integrated circuits (ASICs), digital signal processors (DSPs), field programmable gate arrays (FPGAs), and the like designed to execute the above functions.

The reception part 241 receives detection results by the detector illustrated in Table 1 (hereinafter simply referred to as the "detector") by controlling communication with the detection device 10 via the network N. The reception part 241 can receive detection results by the detector without using the network N by controlling direct communication with the detection device 10. The reception part 241 outputs, among the detection results by the detector, a captured image Im to the acquisition part 242 and the position change part 247, and ambient light information U1 to the ambient light adjustment part 246. Further, the reception part 241 outputs, among the detection results by the detector, traveling speed information U11, following-vehicle speed information U12, inter-vehicle distance information U13, reference speed information U14, traffic rule information U15, streetcar approach information U16, and autonomous driving function information U17 to the generation part 243.

The acquisition part 242 acquires traffic object type information U2, planned right/left turn information U3, pedestrian presence information U4, emergency vehicle path information U5, area definition information U6, guidance path information U8, eye level information U10, emergency vehicle approach information U7, and accident vehicle information U9, by performing computation such as image processing of the captured image Im received from the reception part 241. The acquisition part 242 outputs the acquired information to the generation part 243.

For example, the acquisition part 242 acquires the traffic object type information U2, by performing image processing of the captured image Im to detect the color of a license plate of a traffic object, numbers and characters displayed on the license plate, or the shape of the traffic object.

The acquisition part 242 acquires the planned right/left turn information U3, by performing image processing of the captured image Im to detect the operating state of a direction indicator (blinker) indicating that a traffic object is to turn right or left. Further, the acquisition part 242 acquires the pedestrian presence information U4, by performing image processing of the captured image Im to detect a pedestrian at a location toward which a traffic object is to proceed. Further, the acquisition part 242 acquires the emergency vehicle path information U5, by performing image processing of the captured image Im to detect a path between two adjacent lanes in which a plurality of traffic objects travel and along which an emergency vehicle can travel in an emergency. The acquisition part 242 acquires the area definition information U6 by appropriately defining an area where an emergency vehicle travels in an emergency and an area where traffic objects travel, based on the captured image Im.

The acquisition part 242 acquires the guidance path information U8, by performing image processing of the captured image Im to detect a lane in which an accident vehicle is located and an area on the road where a traffic object can travel. Further, the acquisition part 242 acquires the eye level information U10, by performing image processing of the captured image Im to detect the eye level of the driver of a traffic object. Further, the acquisition part 242 acquires the emergency vehicle approach information U7 by detecting numbers and characters on a license plate of a traffic object or the shape of the traffic object, based on the captured image Im. Further, the acquisition part 242 acquires the accident vehicle information U9 by detecting, as an accident vehicle, a vehicle that stays at the same location for a predetermined period of time based on the captured image Im.

The generation part 243 generates pattern data Pd, which is the source of an irradiation light pattern Lp, by referring to irradiation light pattern information 440 stored in the storage part 244, based on traffic object situation information U received from each of the reception part 241 and the acquisition part 242. For example, the generation part 243 can generate pattern data Pd by referring to the irradiation light pattern information 440, and reading out, from the storage part 244, pattern data Pd associated with traffic object situation information U.

The irradiation light pattern information 440 is information associated with traffic object situation information U. For example, if planned right/left turn information U3-1 indicating that a traffic object is to turn right or left is input as traffic object situation information U, the generation part 243 can generate pattern data Pd3-1 by referring to the irradiation light pattern information 440 and reading out pattern data Pd3-1 associated with the planned right/left turn information U3-1.

Further, the generation part 243 can generate pattern data Pd having a chromaticity determined based on the traffic object type information U2, the reference speed information U14, and the traveling speed information U11. For example, the generation part 243 acquires the reference speed information U14 based on the traffic object type information U2. The reference speed information U14 includes information on a legal speed determined by law on a per-traffic-object type basis, and at least one of the maximum speed or the minimum speed set for a road. The generation part 243 can generate pattern data Pd11-1 having a first chromaticity in a situation in which the traveling speed of a traffic object, obtained from the traveling speed information U11, exceeds the legal speed determined by law on a per-traffic-object type basis or the maximum speed set for the road, or falls below the minimum speed set for the road. The legal speed, the maximum speed, and the minimum speed are included in the reference speed information U14. As an example, pattern data Pd11-1 having a first chromaticity can be generated when the speed of the traffic object exceeds the maximum speed or falls below the minimum speed set for the road. The first chromaticity is, for example, red for issuing a warning. The light emitting device 20 can warn the driver of the traffic object by emitting an irradiation light pattern Lp comprised of red light, based on the red pattern data Pd11-1 generated by the generation part 243.

Further, the generation part 243 can generate pattern data Pd11-2 having a second chromaticity different from the first chromaticity in a situation in which the traveling speed of a traffic object is close to the maximum speed or the minimum speed. The second chromaticity is, for example, yellow for calling attention. The light emitting device 20 can call attention to the driver of the traffic object by emitting irradiation light pattern Lp comprised of yellow light, based on the yellow pattern data Pd11-2 generated by the generation part 243.

The irradiation light pattern Lp comprised of red light or the irradiation light pattern Lp comprised of yellow light is emitted by using, for example, a light emitting element that emits red light or a light emitting element that emits yellow light. Alternatively, the irradiation light pattern Lp comprised of red light or the irradiation light pattern Lp comprised of yellow light can be emitted by combining a light emitting element that emits blue light with a red phosphor or a yellow phosphor.

In FIG. 12, the irradiation control part 245 controls the driving of the plurality of light emitting elements 21 via the output part 248 by outputting a first control signal C1 based on pattern data Pd generated by the generation part 243. The plurality of light emitting elements 21 emit auxiliary light L2 that includes an irradiation light pattern Lp corresponding to the pattern data Pd onto the road surface 400, in response to the first control signal C1 as controlled by the irradiation control part 245.

The ambient light adjustment part 246 adjusts an irradiation light pattern Lp in accordance with the state of ambient light. For example, the ambient light adjustment part 246 outputs brightness information Si of the surroundings of the detection device 10 to the irradiation control part 245, based on the ambient light information U1 input from the reception part 241. The plurality of light emitting elements 21 can irradiate the road surface 400 with the irradiation light pattern Lp whose luminosity is adjusted in accordance with the brightness information Si, as controlled by the irradiation control part 245.

FIG. 13 illustrates an example of a luminosity curve for photopic vision. FIG. 14 illustrates an example of a luminosity curve for scotopic vision. Both FIG. 13 and FIG. 14 are data based on CIE 1951. The ambient light adjustment part 246 adjusts an irradiation light pattern Lp in accordance with the state of ambient light. Thus, the light emitting device 20 can emit the irradiation light pattern Lp with luminosity in accordance with the state of the ambient light. For example, in a bright environment in the daytime, the light emitting device 20 emits an irradiation light pattern Lp in consideration of photopic luminosity illustrated in FIG. 13. Specifically, the light emitting device 20 preferably emits light having a wavelength of 555 nm in the emission spectrum. As an example, if the light emitting device 20 includes a plurality of light emitting elements 21 that emit blue light and a wavelength conversion member, the emission intensity at the wavelength of 555 nm in the emission spectrum of the light emitting device 20 in which all the light emitting elements 21 are turned on is 30% or more, preferably 50% or more, and more preferably 100% or more of the emission intensity at the peak emission wavelength of the light emitting elements 21. Further, as another example, the light emitting device 20 can include light emitting elements with a peak emission wavelength of 500 nm or more and 600 nm or less, and preferably 535 nm or more and 575 nm or less. Conversely, in a dark environment in the morning or at night, the light emitting device 20 can emit an irradiation light pattern Lp in consideration of scotopic luminosity illustrated in FIG. 14. Specifically, the light emitting device 20 preferably emits light having a wavelength of 507 nm in the emission spectrum. As an example, if the light emitting device 20 includes a plurality of light emitting elements 21 that emit blue light and a wavelength conversion member, the emission intensity at the wavelength of 507 nm in the emission spectrum of the light emitting device 20 in which all the light emitting elements 21 are turned on is 10% or more, preferably 20% or more, and more preferably 30% or more of the emission intensity at the peak emission wavelength of the light emitting elements 21. Further, as another example, the light emitting device 20 can include light emitting elements with a peak emission wavelength of 450 nm or more and 550 nm or less, and preferably 475 nm or more and 525 nm or less.

In addition to the above, the emission spectrum of an irradiation light pattern Lp can be selected from appropriate characteristics in accordance with the situation. As an example, in a bright environment in the daytime in which the amount of ambient light is large, an irradiation light pattern Lp can be comprised of light having a plurality of colors based on yellow. Further, in a dark environment in the morning or at night in which the amount of ambient light is small, an irradiation light pattern Lp can be comprised of white light.

For example, the light emitting device 20 can include a first wavelength conversion member for a bright place and a second wavelength conversion member for a dark place, and can switch between the wavelength conversion members for a bright place and a dark place in accordance with the state of ambient light. Further, in another aspect, one or more first light emitting elements of the plurality of light emitting elements 21 can constitute a first light source for a bright place, one or more second light emitting elements of the plurality of light emitting elements 21 can constitute a second light source for a dark place, and the light emitting device 20 can switch between the first light source and the second light source in accordance with the state of ambient light.

In FIG. 12, the position change part 247 changes the distance between a traffic object and a region irradiated with an irradiation light pattern Lp, based on at least one of the traffic object type information U2 or the eye level information U10 acquired by the acquisition part 242. For example, the position change part 247 controls the driving of the inclination mechanism 22, by outputting a second control signal C2 via the output part 248 based on at least one of the traffic object type information U2 or the eye level information U10. The position change part 247 can change the inclination angle of the light emitting device 20 or the plurality of light emitting elements 21 by controlling the driving of the inclination mechanism 22, and thus the position change part 247 can change the position of the irradiation light pattern Lp emitted onto the road surface 400, thereby changing the distance between the traffic object and the region irradiated with the irradiation light pattern Lp. The position change part 247 changes the distance between the traffic object and the region irradiated with the irradiation light pattern Lp, and thus the light emitting device 20 can cause the irradiation light pattern Lp to be easily visible to the driver.

The output part 248 controls communication between the controller 30 and the plurality of light emitting elements 21 in response to the first control signal C1 from the irradiation control part 245. Further, the output part 248 controls communication between the controller 30 and the inclination mechanism 22 in response to the second control signal C2 from the position change part 247.

Examples of Processes by Controller 30

Next, various irradiation light patterns Lp to be emitted from the light emitting device 20 in accordance with the situations of traffic objects, obtained from detection results by the detector, and processes of acquiring the irradiation light patterns Lp by the controller 30 in the traffic system 100 will be described with reference to FIG. 15 through FIG. 27. For example, the detection device 10 periodically transmits detection results to the controller 30 at a cycle of several seconds or the like. The controller 30 executes the processes, which will be described below, in accordance with the situations of the traffic objects obtained from the detection results received from the detection device 10. The light emitting device 20 can irradiate the road surface 400 with the irradiation light patterns Lp in accordance with the situations of the traffic objects obtained from the detection results by the detector.

First Example

Figure 15:
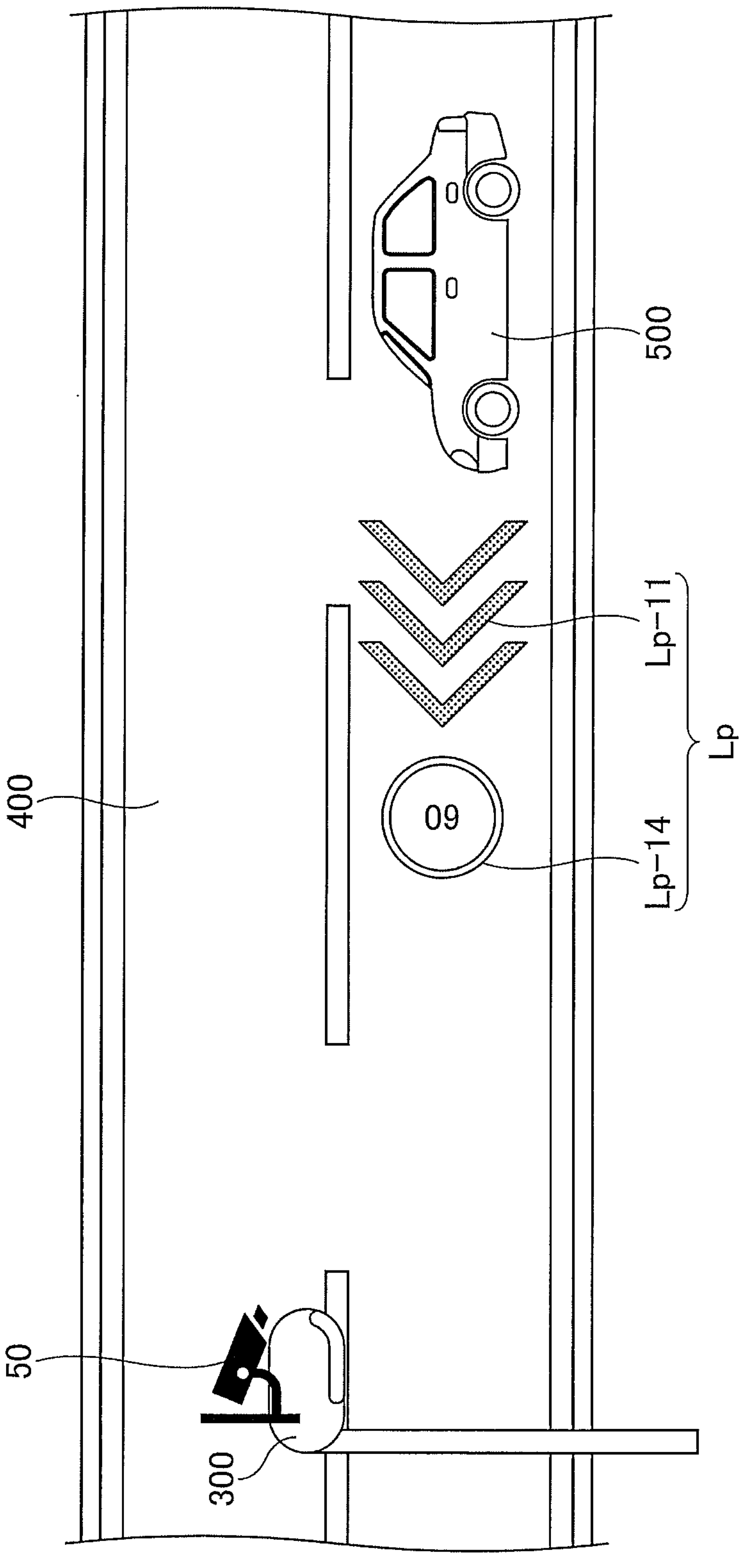
FIG. 15 is a schematic diagram illustrating a first example of an irradiation light pattern according to the embodiment.

FIG. 15 is a schematic diagram illustrating a first example of an irradiation light pattern Lp. In FIG. 15, the unit 50 is disposed in the street lamp 300. The traffic object 500 travels on the road surface 400. The light emitting device 20 of the unit 50 irradiates the road surface 400 with irradiation light patterns Lp-11 and Lp-14 in accordance with the speed of the traffic object 500, detected by the detector. The dot hatching in the irradiation light pattern Lp-11 indicates that the color of the irradiation light pattern Lp-11 is yellow for calling attention. Further, "60" in the irradiation light pattern Lp-14 indicates that the maximum speed set for the road is 60 km/h.

Figure 16:
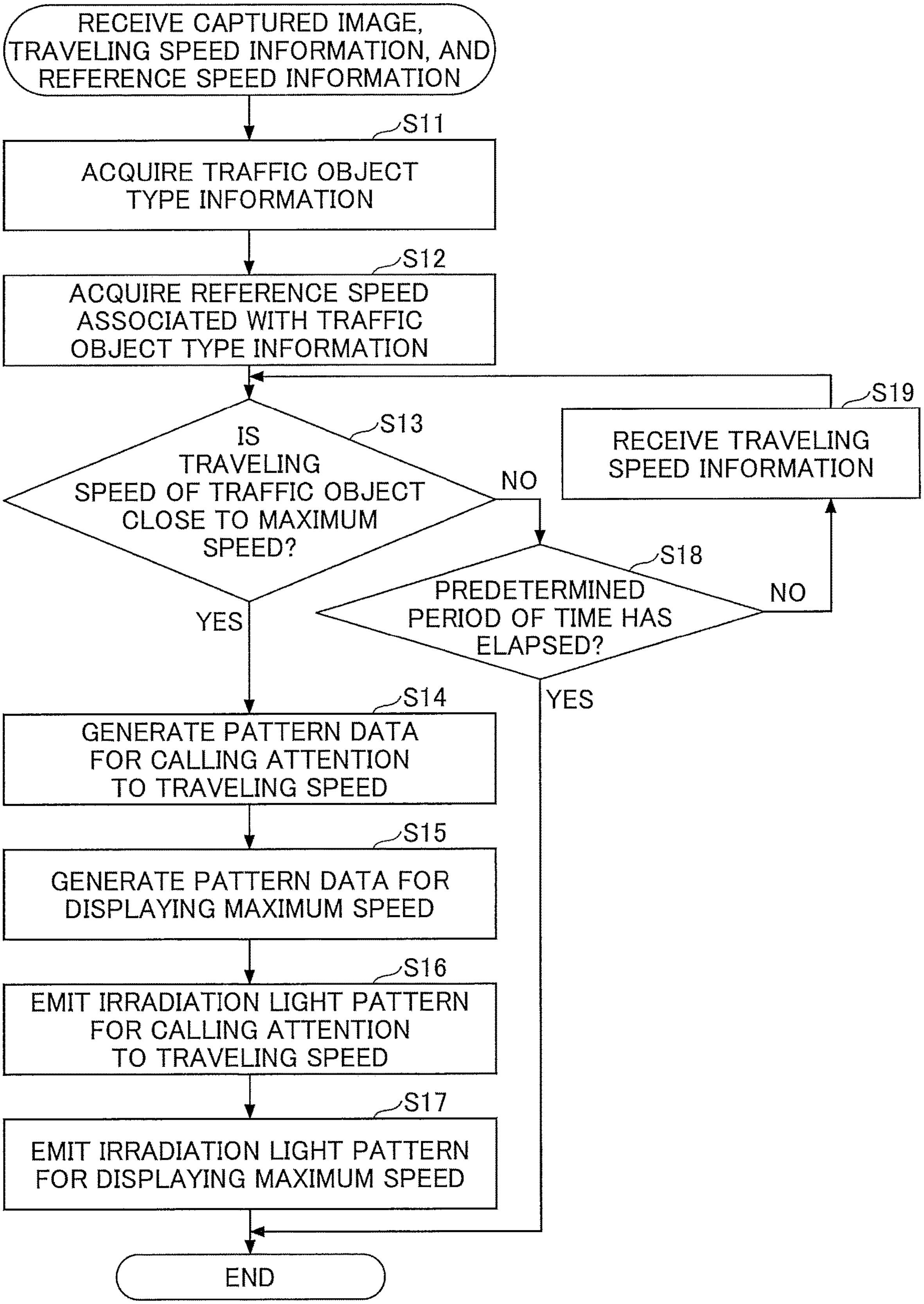
FIG. 16 is a flowchart illustrating a first example of a process performed by controller according to the embodiment.

FIG. 16 is a flowchart illustrating a first example of a process performed by the controller 30. The first example of the process performed by the controller 30 is a process of irradiating the road surface 400 with the irradiation light patterns Lp-11 and Lp-14 illustrated in FIG. 15.

Before the controller 30 starts the process illustrated in FIG. 16, the detection device 10 causes the camera 11 to capture an image of the traffic object 500, and causes the transmission part 159 to transmit the captured image Im to the controller 30. Further, the detection device 10 causes the speed sensor 13 to detect the traveling speed of the traffic object 500, and causes the transmission part 159 to transmit traveling speed information U11 to the controller 30. Further, the detection device 10 receives reference speed information U14, which is information on at least one of the maximum speed or the minimum speed set for the road on which the traffic object 500 travels, from the external server 40. The detection device 10 causes the transmission part 159 to transmit the reference speed information U14 to the controller 30.

The reference speed information U14 transmitted by the detection device 10 includes information on the maximum speed and the minimum speed on a per-traffic-object type basis. If the maximum speed and the minimum speed are not set for the road on which the traffic object 500 travels, the legal speed is set on a per-traffic-object type basis in the reference speed information U14. For example, in the case of Japan, the legal speed is 60 km/h if the traffic object is a standard-sized vehicle, 30 km/h if the traffic object is a motorized bicycle, and 80 km/h if the traffic object is an emergency vehicle. A reference speed can be changed according to a time frame or for any other reason.

For example, the controller 30 starts the process illustrated in FIG. 16 on the condition that the captured image Im, the traveling speed information U11, and the reference speed information U14 described above are received from the detection device 10.

First, in step S11, the controller 30 causes the acquisition part 242 to acquire traffic object type information U2, by performing image processing of the captured image Im to detect the color of a license plate of the traffic object, numbers and characters displayed on the license plate, the shape of the traffic object, or the like.

Next, in step S12, the controller 30 causes the generation part 243 to acquire, among reference speeds set in the reference speed information U14 for respective types of traffic objects, a reference speed associated with the traffic object type information U2 acquired by the acquisition part 242. In this example, the acquisition part 242 acquires the maximum speed as a reference speed, among the maximum speed and the minimum speed.

Next, in step S13, the controller 30 causes the generation part 243 to determine whether the traveling speed is close to the maximum speed by comparing the traveling speed indicated by the traveling speed information U11 with the maximum speed associated with the traffic object type information U2. For example, first, the generation part 243 calculates the absolute value of the difference between the maximum speed and the traveling speed. Then, if the calculated value is less than or equal to a predetermined speed threshold, the generation part 243 determines that the traveling speed is close to the maximum speed.

If it is determined that the traveling speed is close to the maximum speed in step S13 (YES in step S13), the controller 30 causes the generation part 243 to generate pattern data Pd11-2 for calling attention to the traveling speed in step S14.

Next, in step S15, the controller 30 causes the generation part 243 to generate pattern data Pd14-1 for displaying the maximum speed.

The order of steps S14 and S15 can be changed as appropriate, or steps S14 and S15 can be executed in parallel.

Next, in step S16, based on the pattern data Pd11-2, the controller 30 causes the irradiation control part 245 to control the light emitting device 20 to irradiate the road surface 400 with the irradiation light pattern Lp-11 for calling attention to the traveling speed. The light emitting device 20 can irradiate the road surface 400 with the irradiation light pattern Lp-11 of yellow light (light having the second chromaticity) in a situation in which the traveling speed is close to the maximum speed. By causing the light emitting device 20 to irradiate the road surface 400 with the irradiation light pattern Lp-11 of yellow light, the driver of the traffic object 500 can visually recognize the irradiation light pattern Lp-11 and thus can be alerted to the traveling speed.

Next, in step S17, based on the pattern data Pd14-1, the controller 30 causes the irradiation control part 245 to control the light emitting device 20 to irradiate the road surface 400 with the irradiation light pattern Lp-14 for displaying the maximum speed. The light emitting device 20 can further irradiate the road surface 400 with the irradiation light pattern Lp-14 that includes information on the maximum speed of the road. By causing the light emitting device 20 to irradiate the road surface 400 with the irradiation light pattern Lp-14, the driver of the traffic object 500 can visually recognize the irradiation light pattern Lp-14, and thus can recognize the maximum speed.

The order of steps S16 and S17 can be changed as appropriate, or steps S16 and S17 can be executed in parallel.

The light emitting device 20 stops the irradiation of each of the irradiation light patterns Lp-11 and Lp-14 after a predetermined irradiation period of time elapses. The irradiation period of time is preferably set to a period of time necessary and sufficient for the driver of the traffic object 500 to visually recognize the irradiation light pattern Lp. The controller 30 ends the process after the predetermined irradiation period of time elapses and the irradiation of each of the irradiation light patterns Lp-11 and Lp-14 is stopped. In addition to the above, the travel position of the traffic object 500 or the like can be used as a condition for stopping the irradiation.

Conversely, if it is determined that the traveling speed is not close to the maximum speed in step S13 (NO in step S13), the controller 30 causes to process to proceed to step S18.

Next, in step S18, the controller 30 determines whether a predetermined period of time has elapsed. For example, the controller 30 determines whether the predetermined period of time has elapsed by measuring the elapsed time from the start of the process illustrated in FIG. 16 with a timer, and comparing the elapsed time with the predetermined period of time.

If it is determined that the predetermined period of time has elapsed in step S18 (YES in step S18), the controller 30 ends the process. Conversely, if it is determined that the predetermined period of time has not elapsed (NO in step S18), the controller 30 receives traveling speed information U11 again in step S19. The controller 30 executes the step S13 and the subsequent steps again based on a traveling speed updated by the traveling speed information U11 received again, and repeats these steps until the predetermined period of time elapses.

In this manner, the controller 30 can execute the process of irradiating the road surface 400 with the irradiation light patterns Lp-11 and Lp-14.

The light emitting device 20 can emit one of the irradiation light patterns Lp-11 and Lp-14, or can emit both the irradiation light pattern Lp-11 and the irradiation light pattern Lp-14.

The reference speed in FIG. 16 is not limited to the maximum speed, and can be the minimum speed. Specifically, the light emitting device 20 can emit the irradiation light pattern of yellow light (light having the second chromaticity) in a situation in which the traveling speed of the traffic object 500 is close to the minimum speed. Further, the light emitting device 20 can emit an irradiation light pattern that includes information indicating the minimum speed of the road.

Further, the light emitting device 20 can emit an irradiation light pattern of red light (light having the first chromaticity) in a situation in which the traveling speed of the traffic object 500 exceeds the maximum speed or falls below the minimum speed, based on the traffic object type information U2 and information on the maximum speed or the minimum speed set for the road on which the traffic object 500 travels. Each of the first chromaticity and the second chromaticity can be any chromaticity.

Second Example

Figure 17:
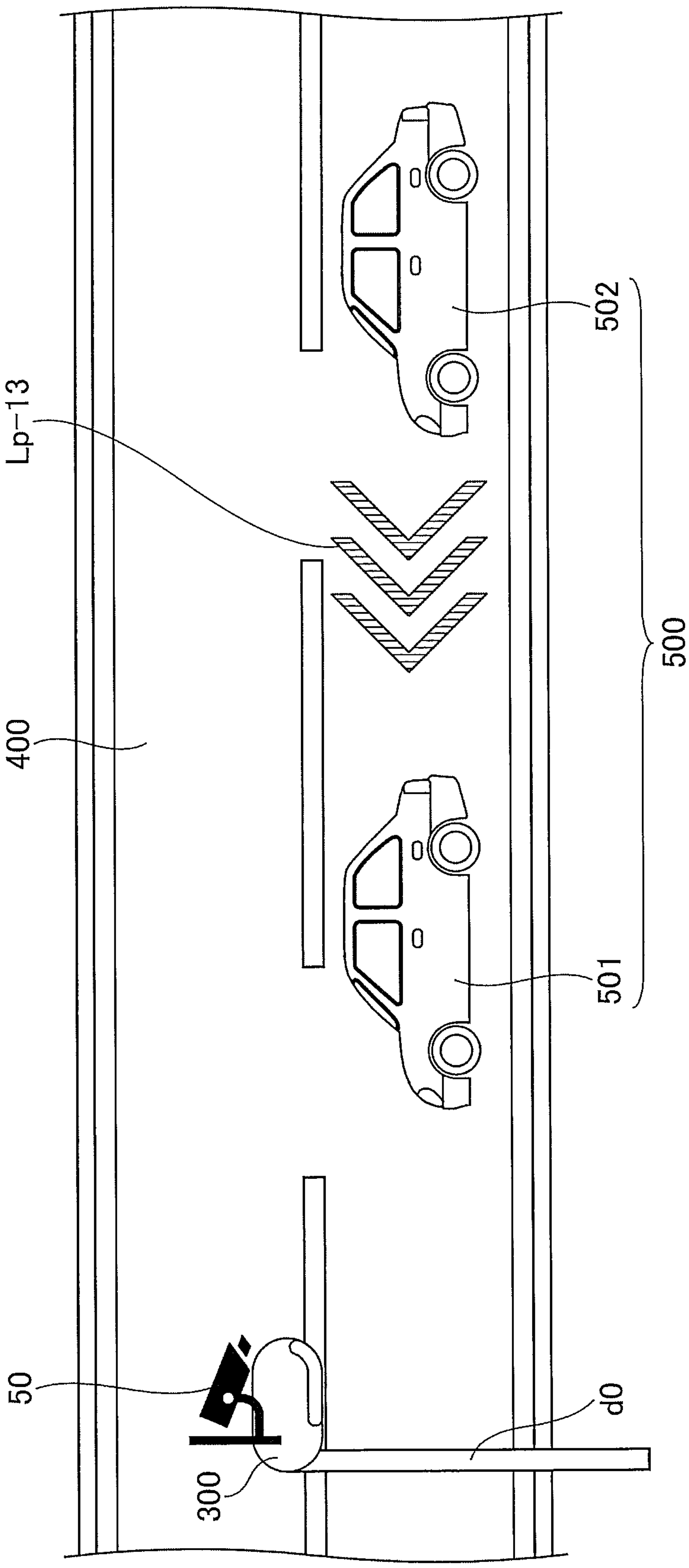
FIG. 17 is a schematic diagram illustrating a second example of an irradiation light pattern according to the embodiment.

FIG. 17 is a schematic diagram illustrating a second example of an irradiation light pattern Lp. In FIG. 17, the unit 50 is disposed in the street lamp 300. The traffic object 500 includes a preceding vehicle 501 and a following vehicle 502. The preceding vehicle 501 and the following vehicle 502 travel on the road surface 400. The light emitting device 20 of the unit 50 irradiates the road surface 400 with an irradiation light pattern Lp-13 in accordance with the inter-vehicle distance between the preceding vehicle 501 and the following vehicle 502, detected by the detector. The solid-line hatching in the irradiation light pattern Lp-13 indicates that the color of the irradiation light pattern Lp-13 is red for issuing a warning. The color of the irradiation light pattern Lp can be changed to any color.

Figure 18:
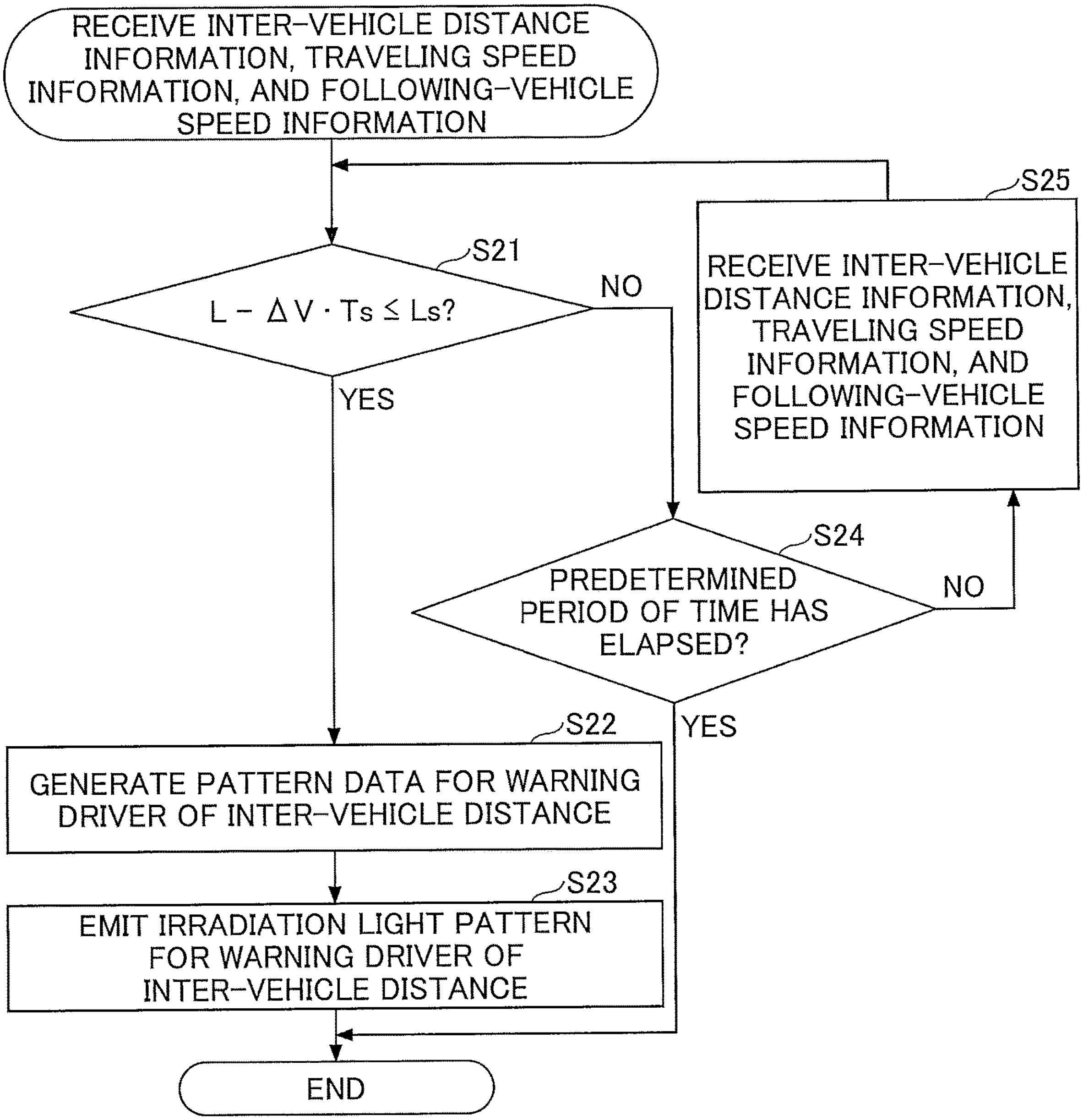
FIG. 18 is a flowchart illustrating a second example of a process performed by controller according to the embodiment.

FIG. 18 is a flowchart illustrating a second example of a process performed by the controller 30. The second example of the process performed by the controller 30 is a process of emitting the irradiation light pattern Lp-13 illustrated in FIG. 17.

Before the controller 30 starts the process illustrated in FIG. 18, the detection device 10 causes the distance sensor 14 to detect an inter-vehicle distance L, and causes the transmission part 159 to transmit inter-vehicle distance information U13 to the controller 30. Further, the detection device 10 causes the speed sensor 13 to detect the traveling speed of the preceding vehicle 501, and causes the transmission part 159 to transmit traveling speed information U11 to the controller 30. Further, the detection device 10 causes the speed sensor 13 to detect the traveling speed of the following vehicle 502, and causes the transmission part 159 to transmit following-vehicle speed information U12 to the controller 30.

For example, the controller 30 starts the process illustrated in FIG. 18 on the condition that the inter-vehicle distance information U13, the traveling speed information U11, and the following-vehicle speed information U12 described above are received from the detection device 10.

Further, in step S21, the controller 30 causes the generation part 243 to determine whether the following formula (1) is satisfied. In the formula (1), ΔV denotes a traveling speed difference between the preceding vehicle 501 and the following vehicle 502, Ts is a time threshold, and Ls is a distance threshold. The time threshold Ts and the distance threshold Ls are predetermined thresholds to avoid collision between the preceding vehicle 501 and the following vehicle 502.

$$L-\Delta V\cdot Ts\leq Ls \tag{1}$$

If it is determined that the formula (1) is satisfied in step S21 (YES in step S21), the controller 30 generates pattern data Pd13-1 for warning the driver of the inter-vehicle distance in step S22.

Next, in step S23, based on the pattern data Pd13-1, the controller 30 causes the irradiation control part 245 to control the light emitting device 20 to irradiate the road surface 400 with the irradiation light pattern Lp-13 for warning the driver of the inter-vehicle distance. The light emitting device 20 can irradiate the road surface 400 with the irradiation light pattern Lp-13, based on the inter-vehicle distance information U13 between the preceding vehicle 501 and the following vehicle 502, and the traveling speed difference ΔV between the preceding vehicle 501 and the following vehicle 502. By causing the light emitting device 20 to irradiate the road surface 400 with the irradiation light pattern Lp-13 of red light, the driver of the traffic object 500 can visually recognize the irradiation light pattern Lp-13, and thus can be warned of the inter-vehicle distance.

The light emitting device 20 stops the irradiation of the irradiation light pattern Lp-13 after a predetermined irradiation period of time elapses. The controller 30 ends the process after the predetermined irradiation period of time elapses and the irradiation of the irradiation light pattern Lp-13 is stopped.

Conversely, if it is determined that the formula (1) is not satisfied in step S21 (NO in step S21), the controller 30 determines whether a predetermined period of time has elapsed in step S24. For example, the controller 30 determines whether the predetermined period of time has elapsed by measuring the elapsed time from the start of the process illustrated in FIG. 18 with a timer, and comparing the elapsed time with the predetermined period of time.

If it is determined that the predetermined period of time has elapsed in step S24 (YES in step S24), the controller 30 ends the process. Conversely, if it is determined that the predetermined period of time has not elapsed (NO in step S24), the controller 30 receives inter-vehicle distance information U13, traveling speed information U11, and following-vehicle speed information U12 from the detection device 10 again in step S25. The controller 30 executes the step S21 and the subsequent steps again based on an inter-vehicle distance L and a traveling speed difference ΔV updated by the inter-vehicle distance information U13, the traveling speed information U11, and the following-vehicle speed information U12 received again, and repeats these steps until the predetermined period of time elapses.

In this manner, the controller 30 can execute the process of irradiating the road surface 400 with the irradiation light pattern Lp-13.

The controller 30 can acquire information on the wet condition of the road surface 400 and the weather, based on a captured image Im captured by the camera 11 or information from the external server 40, and can change the time thresholds Ts and the distance threshold Ls according to the wet condition of the road surface 400 and the weather. Accordingly, the high-safety time threshold Ts and distance threshold Ls can be set according to the braking distance of a traffic object, which changes in accordance with the wet condition of the road surface 400.

Instead of using the inter-vehicle distance information U13 and the following-vehicle speed information U12, the detection device 10 can set a reference position do (see FIG. 17), and use the number of seconds during which the preceding vehicle 501 and the following vehicle 502 pass through the reference position do. In the embodiment as illustrated in FIG. 17, the position of the pole of the street lamp 300 is set as the reference position do. Any position can be set as the reference position do. For example, if the absolute value of the difference between time T1 for the preceding vehicle 501 to pass through the reference position do and time T2 for the following vehicle 502 to pass through the reference position do is less than or equal to a time threshold Ts1, the light emitting device 20 can issue a warning or call attention to the driver of the traffic object 500 by emitting the irradiation light pattern Lp.

Third Example

Figure 19:
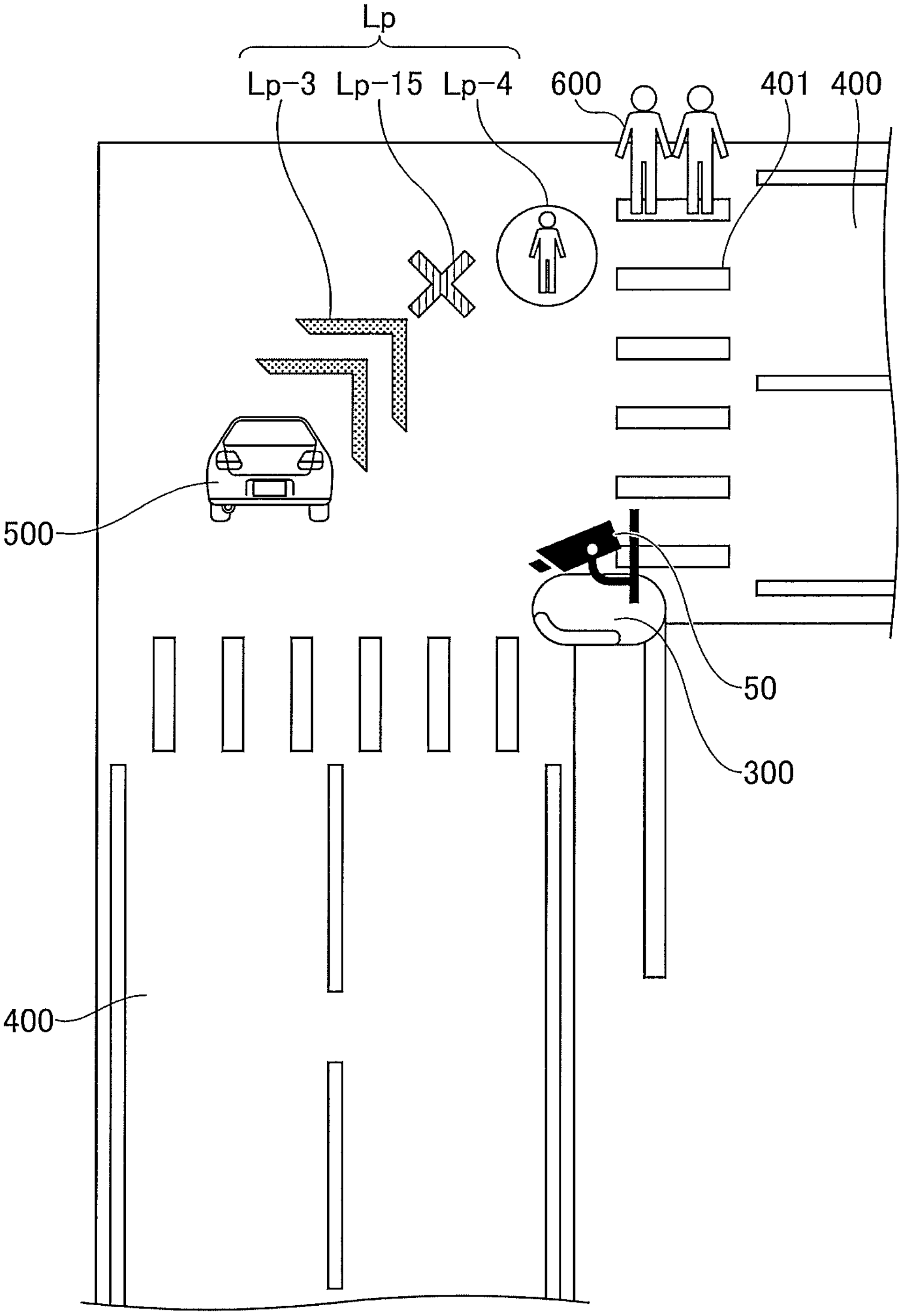
FIG. 19 is a schematic diagram illustrating a third example of an irradiation light pattern according to the embodiment.

FIG. 19 is a schematic diagram illustrating a third example of a light irradiation pattern Lp. In FIG. 19, the unit 50 is disposed in the street lamp 300. The traffic object 500 travels on the road surface 400 and is to turn right. There is a crosswalk 401 at a location toward which the traffic object 500 is to proceed. A pedestrian 600 is present in the vicinity of the crosswalk 401. The light emitting device 20 of the unit 50 irradiates the road surface 400 with irradiation light patterns Lp-3, Lp-4, and Lp-15 in accordance with the situation of the traffic object 500 at an intersection, detected by the detector. The dot hatching in the irradiation light pattern Lp-3 indicates that the color of the irradiation light pattern Lp-3 is yellow for calling attention. Further, the solid-line hatching in the irradiation light pattern Lp-15 indicates that the color of the irradiation light pattern Lp-15 is red for warning. The color, shape, and the like of the irradiation light pattern Lp can be appropriately changed, and can be changed in accordance with the situation of the traffic object 500, the pedestrian 600, or the like.

Figure 20:
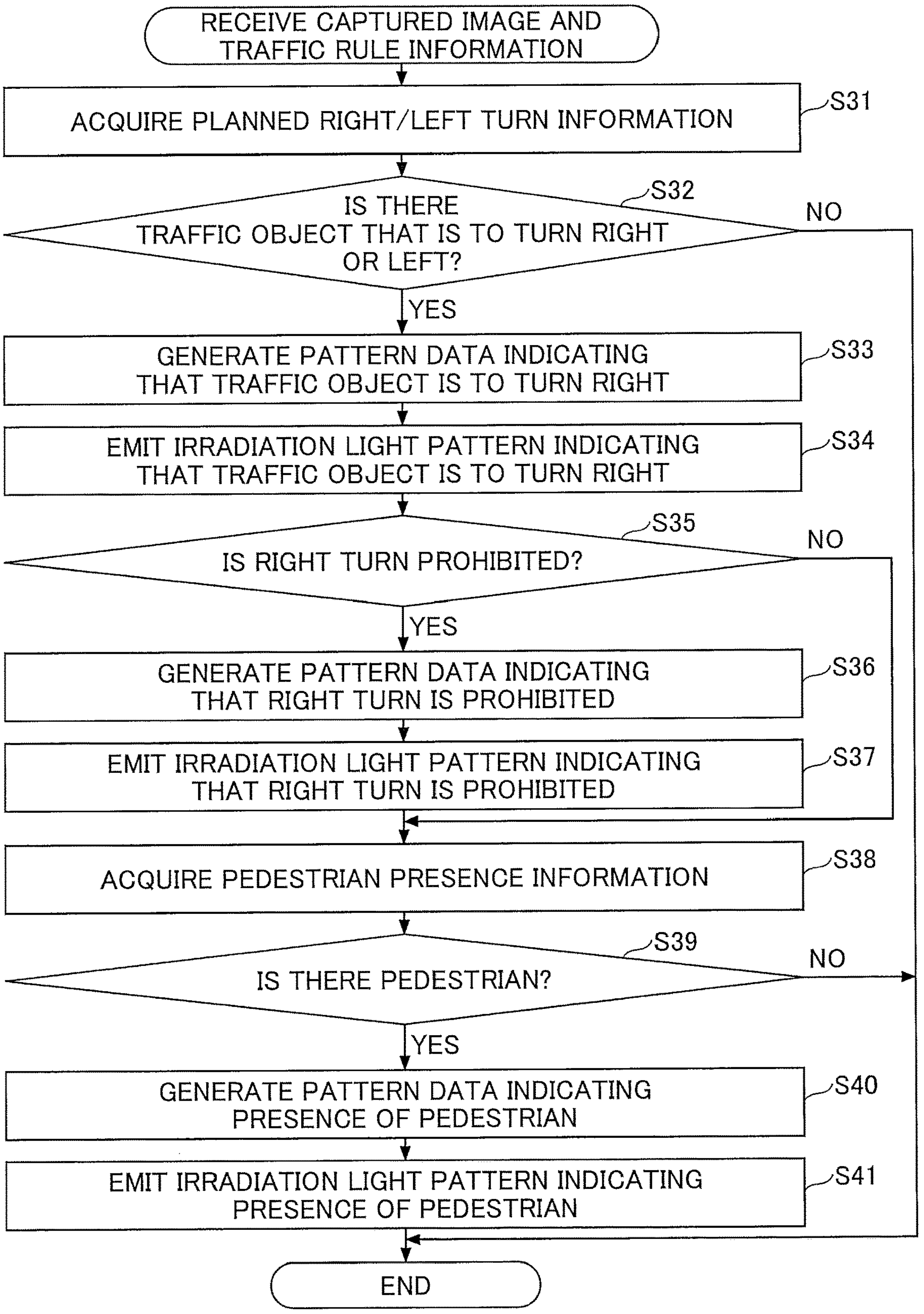
FIG. 20 is a flowchart illustrating a third example of a process performed by the controller according to the embodiment.

FIG. 20 is a flowchart illustrating a third example of a process performed by the controller 30. The third example of the process performed by the controller 30 is a process of emitting the irradiation light patterns Lp-3, Lp-4, and Lp-15 illustrated in FIG. 19.

Before the controller 30 starts the process illustrated in FIG. 20, the detection device 10 causes the camera 11 to capture an image of the vicinity of the intersection, and causes the transmission part 159 to transmit the captured image Im to the controller 30. Further, the detection device 10 receives, from the external server 40, traffic rule information U15 on traffic rules of the intersection at which the traffic object 500 is to turn right, and causes the transmission part 159 to transmit the traffic rule information U15 to the controller 30.

For example, the controller 30 starts the process illustrated in FIG. 20 on the condition that the captured image Im and the traffic rule information U15 described above are received from the detection device 10.

First, in step S31, the controller 30 causes the acquisition part 242 to acquire planned right/left turn information U3, by performing image processing of the captured image Im to detect the operating state of a direction indicator (blinker) indicating that a traffic object is to turn right or left.

Next, in step S32, the controller 30 causes the acquisition part 242 to determine whether there is a traffic object that is to turn right or left. If it is determined that there is no traffic object that is to turn right or left in step S32 (NO in step S32), the controller 30 ends the process. Conversely, if it is determined that there is a traffic object that is to turn right or left in step S32 (YES in step S32), the controller 30 causes the generation part 243 to generate pattern data Pd indicating that the traffic object is to turn right or left in step S33. In the example illustrated in FIG. 19, the traffic object 500 is to turn right, and thus the generation part 243 generates pattern data Pd3-1 indicating that the traffic object 500 is to turn right.

Next, in step S34, based on the pattern data Pd3-1, the controller 30 causes the irradiation control part 245 to control the light emitting device 20 to irradiate the road surface 400 with the irradiation light pattern Lp-3 of yellow light for calling attention to a right turn. In a situation in which the traffic object 500 is detected at the intersection and the direction indicator of the traffic object 500 is turned on, the light emitting device 20 can irradiate the road surface 400 with the irradiation light pattern Lp-3 indicating that the traffic object 500 is to turn right. By causing the light emitting device 20 to irradiate the road surface 400 with the irradiation light pattern Lp-3, the drivers of traffic objects in the vicinity of the intersection can visually recognize the irradiation light pattern Lp-3, and thus can recognize that the traffic object 500 is to turn right.

Next, in step S35, the controller 30 causes the generation part 243 to refer to the traffic rule information U15, and determines whether a right turn is prohibited by the traffic rules of the intersection at which the traffic object 500 is to turn right.

If it is determined that a right turn is not prohibited in step S35 (NO in step S35), the controller 30 causes the process to proceed to step S38. Conversely, if it is determined that a right turn is prohibited in step S35 (YES in step S35), the controller 30 causes the generation part 243 to generate pattern data Pd15-1 indicating that a right turn is prohibited in step S36.

Next, in step S37, based on the pattern data Pd15-1, the controller 30 causes the irradiation control part 245 to control the light emitting device 20 to irradiate the road surface 400 with the irradiation light pattern Lp-15 of red light indicating that a right turn is prohibited. In a situation in which entry into the intersection or a corner is prohibited based on the traffic rule information U15 on the traffic rules, the light emitting device 20 can irradiate the irradiation light pattern Lp-15 indicating that the entry is prohibited. By causing the light emitting device 20 to irradiate the road surface 400 with the irradiation light pattern Lp-15, the driver of the traffic object 500 can visually recognize the irradiation light pattern Lp-15, and thus can recognize that a right turn is prohibited at the intersection toward which the traffic object 500 is to proceed. In the present embodiment, the phrase "situation in which entry is prohibited" includes "no right/left turn", "one-way", "no U-turn", and "under construction".

Next, in step S38, the controller 30 causes the acquisition part 242 to acquire pedestrian presence information U4 by performing image processing of the captured image Im to detect a pedestrian in the vicinity of the crosswalk toward which the traffic object is to proceed.

Next, in step S39, the controller 30 causes the acquisition part 242 to determine whether there is a pedestrian. If it is determined that there is no pedestrian in step S39 (NO in step S39), the controller 30 ends the process. Conversely, If it is determined that there is a pedestrian in step S39 (YES in step S39), the controller 30 causes the generation part 243 to generate pattern data Pd4-1 indicating the presence of the pedestrian in step S40.

Next, in step S41, based on the pattern data Pd4-1, the controller 30 causes the irradiation control part 245 to control the light emitting device 20 to irradiate the road surface 400 with the irradiation light pattern Lp-4 indicating the presence of the pedestrian 600. In a situation in which the pedestrian 600 is detected in the vicinity of the intersection toward which the traffic object 500 is to proceed, the light emitting device 20 can irradiate the irradiation light pattern Lp-4 indicating the presence of the pedestrian 600. By causing the light emitting device 20 to irradiate the road surface 400 with the irradiation light pattern Lp-4, the driver of the traffic object 500 can recognize that there is the pedestrian 600 at the location toward which the traffic object 500 is to proceed.

The order of a set of steps S31 to S34, a set of steps S35 to S37, and a set of steps S38 to S41 can be changed as appropriate, or the sets of steps can be executed in parallel.

The light emitting device 20 stops the irradiation of each of the irradiation light patterns Lp-3, Lp-4, and Lp-15 after a predetermined irradiation period of time elapses. The controller 30 ends the process after the predetermined irradiation period of time elapses and the irradiation of each of the irradiation light patterns Lp-3, Lp-4, and Lp-15 is stopped.

In this manner, the controller 30 can execute the process of irradiating the road surface 400 with the irradiation light patterns Lp-3, Lp-4, and Lp-15.

The light emitting device 20 can emit one irradiation light pattern among the irradiation light patterns Lp-3, Lp-4, and Lp-15, or can emit two or more irradiation light patterns among the irradiation light patterns Lp-3, Lp-4, and Lp-15.

Fourth Example

Figure 21:
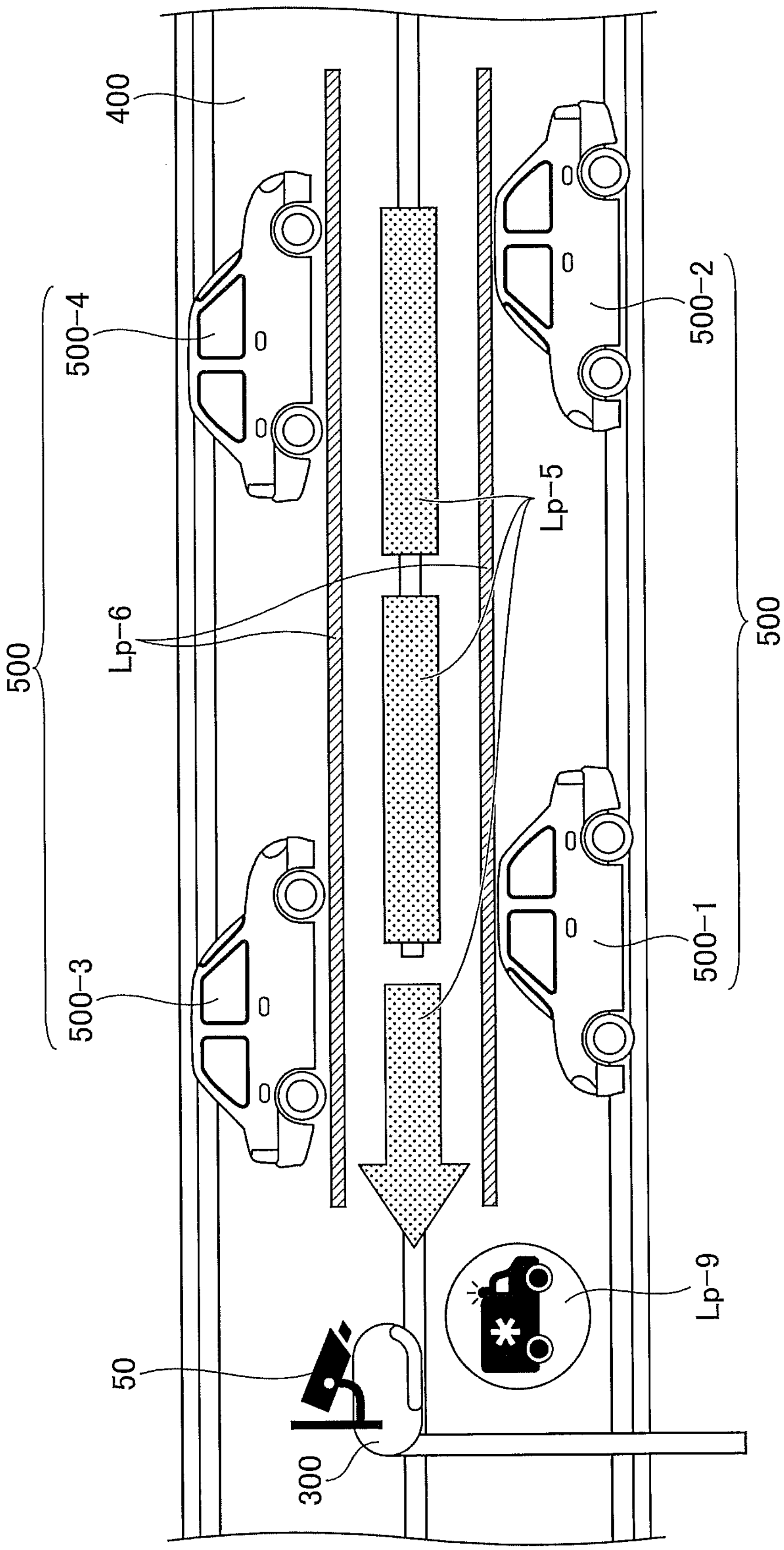
FIG. 21 is a schematic diagram illustrating a fourth example of an irradiation light pattern according to the embodiment.

FIG. 21 is a schematic diagram illustrating a fourth example of a light irradiation pattern Lp. In FIG. 21, the unit 50 is disposed in the street lamp 300. The traffic object 500 includes traffic objects 500-1, 500-2, 500-3, and 500-4. Each of the traffic objects 500-1, 500-2, 500-3, and 500-4 travels on the road surface 400. The light emitting device 20 of the unit 50 irradiates the road surface 400 with irradiation light patterns Lp-5, Lp-6, and Lp-9 in accordance with the state of approach of an emergency vehicle.

The irradiation light pattern Lp-5 is for presenting a path between two adjacent lanes in which the plurality of traffic objects 500-1, 500-2, 500-3, and 500-4 travel and along which the emergency vehicle can travel in an emergency. The irradiation light pattern Lp-6 is for defining an area where the emergency vehicle travels in an emergency and an area where the plurality of traffic objects 500-1, 500-2, 500-3, and 500-4 travel. The irradiation light pattern Lp-9 is for indicating the approach of the emergency vehicle to the traffic objects 500-1 and 500-2 traveling ahead of the emergency vehicle. It is assumed that the emergency vehicle is traveling at a position behind and away from the traffic objects 500-1 and 500-2 in the traveling direction.

Figure 22:
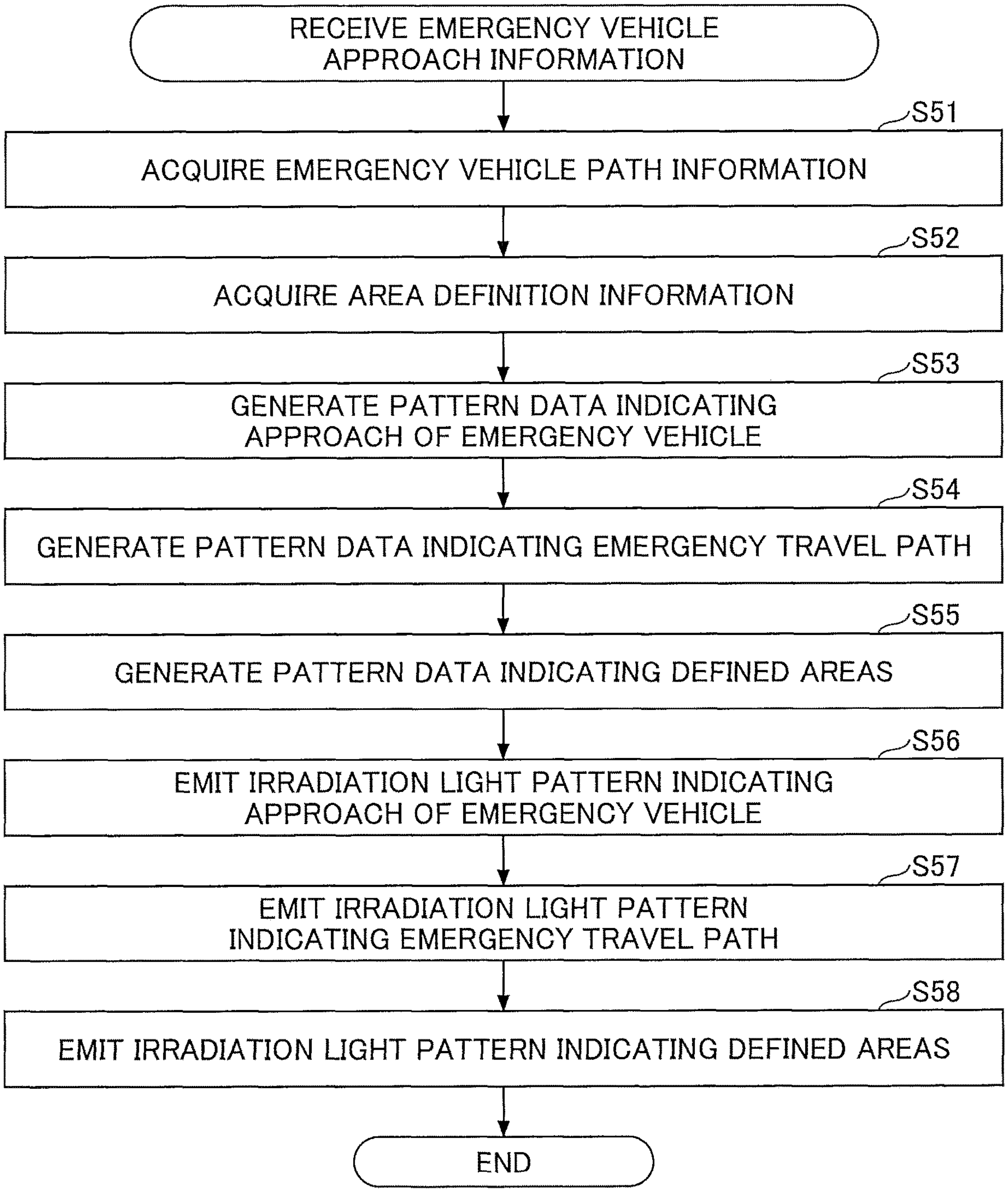
FIG. 22 is a flowchart illustrating a fourth example of a process performed by the controller according to the embodiment.

FIG. 22 is a flowchart illustrating a fourth example of a process performed by the controller 30. The fourth example of the process performed by the controller 30 is a process of irradiating the road surface 400 with the irradiation light patterns Lp-5, Lp-6, and Lp-9 illustrated in FIG. 21.

Before the controller 30 starts the process illustrated in FIG. 22, the detection device 10 receives, from another unit 50 located near the emergency vehicle via the network N, emergency vehicle approach information U7 detected by the other unit 50 based on a captured image Im. The detection device 10 causes the transmission part 159 to transmit the emergency vehicle approach information U7 to the controller 30. However, if the unit 50 illustrated in FIG. 21 is located closest to the emergency vehicle among one or more units 50, the detection device 10 included in the unit 50 illustrated in FIG. 21 can detect the emergency vehicle approach information U7 based on a captured image Im. Further, if the emergency vehicle itself transmits information such as position information or destination information, the detection device 10 can detect the emergency vehicle approach information U7 by receiving the information, transmitted by the emergency vehicle itself, via the external server 40, for example. Further, the emergency vehicle can emit sound, light, or the like, and the detection device 10 can detect the emergency vehicle approach information U7 by detecting the sound, the light, or the like.

For example, the controller 30 starts the process illustrated in FIG. 22 on the condition that the emergency vehicle approach information U7 described above is received from the detection device 10.

First, in step S51, the controller 30 causes the acquisition part 242 to acquire emergency vehicle path information U5 by performing image processing of a captured image Im to detect a path between two adjacent lanes in which the plurality of traffic objects 500-1, 500-2, 500-3, and 500-4 travel and along which the emergency vehicle can travel in an emergency.

Next, in step S52, the controller 30 causes the acquisition part 242 to acquire area definition information U6 by appropriately defining an area on the road where the emergency vehicle travels and an area where the traffic objects travel based on the captured image Im.

The order of steps S51 and S52 can be changed as appropriate, or steps S51 and S52 can be executed in parallel.

Next, in step S53, the controller 30 causes the generation part 243 to generate pattern data Pd9-1 indicating the approach of the emergency vehicle.

Next, in step S54, the controller 30 causes the generation part 243 to generate pattern data Pd5-1 indicating the emergency travel path of the emergency vehicle.

Next, in step S55, the controller 30 causes the generation part 243 to generate pattern data Pd6-1 indicating the defined areas.

The order of steps S53 to S55 can be changed as appropriate, or steps S53 to S55 can be executed in parallel.

Next, in step S56, based on the pattern data Pd9-1, the controller 30 causes the irradiation control part 245 to control the light emitting device 20 to irradiate the road surface 400 with the irradiation light pattern Lp-9 indicating the approach of the emergency vehicle. The light emitting device 20 can irradiate the road surface 400 with the irradiation light pattern Lp-9 indicating the approach of the emergency vehicle to the traffic objects 500-1 and 500-2 traveling ahead of the emergency vehicle. By causing the light emitting device 20 to irradiate the road surface 400 with the irradiation light pattern Lp-9, the drivers of the traffic objects 500-1 and 500-2 traveling ahead of the emergency vehicle can visually recognize the irradiation light pattern Lp-9, and thus can recognize that emergency vehicle is approaching from behind.

Next, in step S57, based on the pattern data Pd5-1, the controller 30 causes the irradiation control part 245 to control the light emitting device 20 to irradiate the road surface 400 with the irradiation light pattern Lp-5 for presenting the path along which the emergency vehicle can travel in an emergency. The light emitting device 20 can irradiate the road surface 400 with the irradiation light pattern Lp-5 for presenting the path along which the emergency vehicle can travel in an emergency. By causing the light emitting device 20 to irradiate the road surface 400 with the irradiation light pattern Lp-5, the drivers of the traffic objects 500-1, 500-2, 500-3, and 500-4, the driver of the emergency vehicle, and the like can visually recognize the irradiation light pattern Lp-5, and thus can recognize the path along which the emergency vehicle can travel in an emergency.

Next, in step S58, based on the pattern data Pd6-1, the controller 30 causes the irradiation control part 245 to control the light emitting device 20 to irradiate the road surface 400 with the irradiation light pattern Lp-6 indicating the defined areas. The light emitting device 20 can irradiate the road surface 400 with the irradiation light pattern Lp-6 indicating the area on the road where the emergency vehicle travels in an emergency and the area where the traffic objects travel. By causing the light emitting device 20 to irradiate the road surface 400 with the irradiation light pattern Lp-6, the drivers of the traffic objects 500-1, 500-2, 500-3, and 500-4 traveling on the road surface 400, the driver of the emergency vehicle, and the like can visually recognize the irradiation light pattern Lp-6, and thus can recognize the area where the traffic objects can travel and the area where the emergency vehicle can travel.

The order of steps S56 to S58 can be changed as appropriate, or steps S56 to S58 can be executed in parallel.

The light emitting device 20 stops the irradiation of each of the irradiation light patterns Lp-5, Lp-6, and Lp-9 after a predetermined irradiation period of time elapses. The controller 30 ends the process after the predetermined irradiation period of time elapses and the irradiation of each of the irradiation light patterns Lp-5, Lp-6, and Lp-9 is stopped.

In this manner, the controller 30 can execute the process of irradiating the road surface 400 with the irradiation light patterns Lp-5, Lp-6, and Lp-9.

The light emitting device 20 can emit one irradiation light pattern among the irradiation light patterns Lp-5, Lp-6, and Lp-9, or can emit two or more irradiation light patterns among the irradiation light patterns Lp-5, Lp-6, and Lp-9.

Fifth Example

Figure 23:
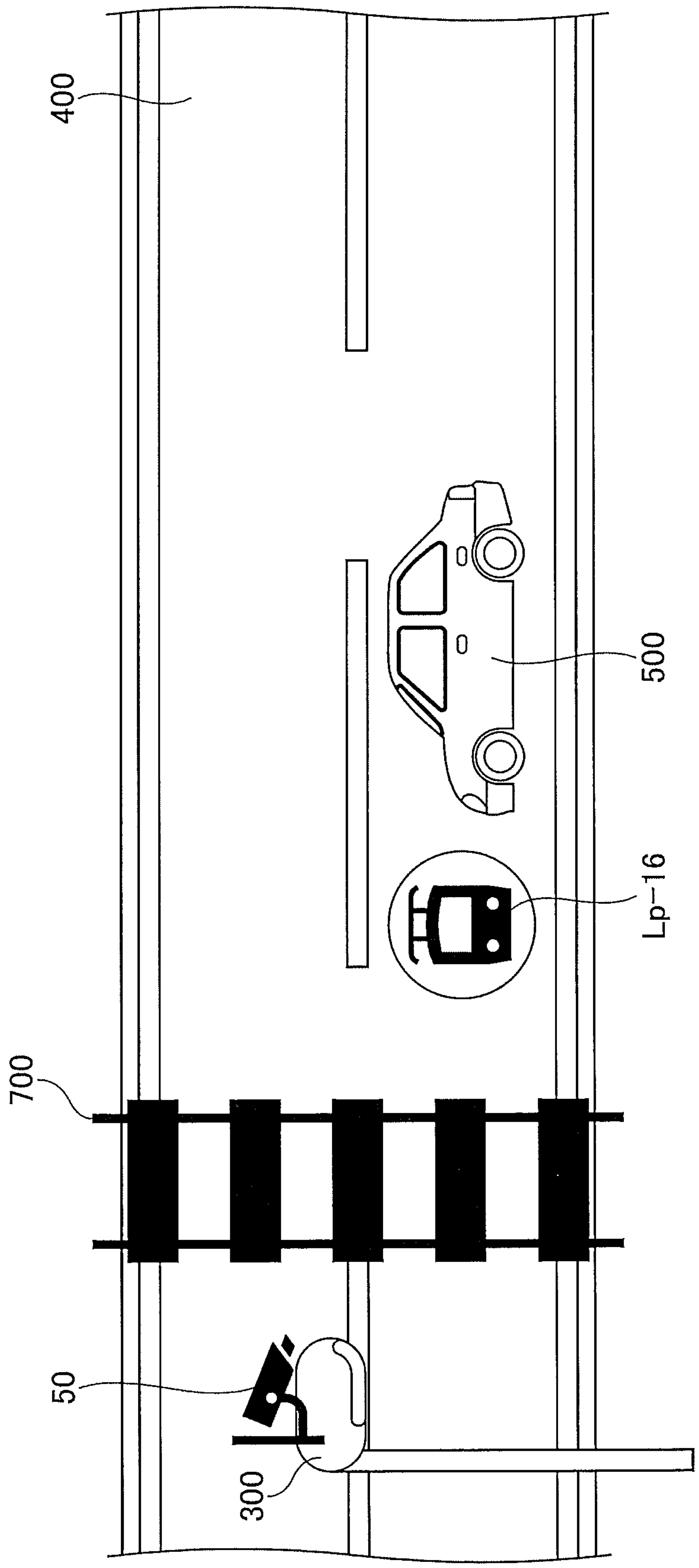
FIG. 23 is a schematic diagram illustrating a fifth example of an irradiation light pattern according to the embodiment.

FIG. 23 is a schematic diagram illustrating a fifth example of an irradiation light pattern Lp. In FIG. 23, the unit 50 is disposed in the street lamp 300. The traffic object 500 travels on the road surface 400. The light emitting device 20 of the unit 50 irradiates the road surface 400 with an irradiation light pattern Lp-16 in accordance with the state of approach of a streetcar, detected by the detector. The irradiation light pattern Lp-16 is for indicating the approach of the streetcar.

Figure 24:
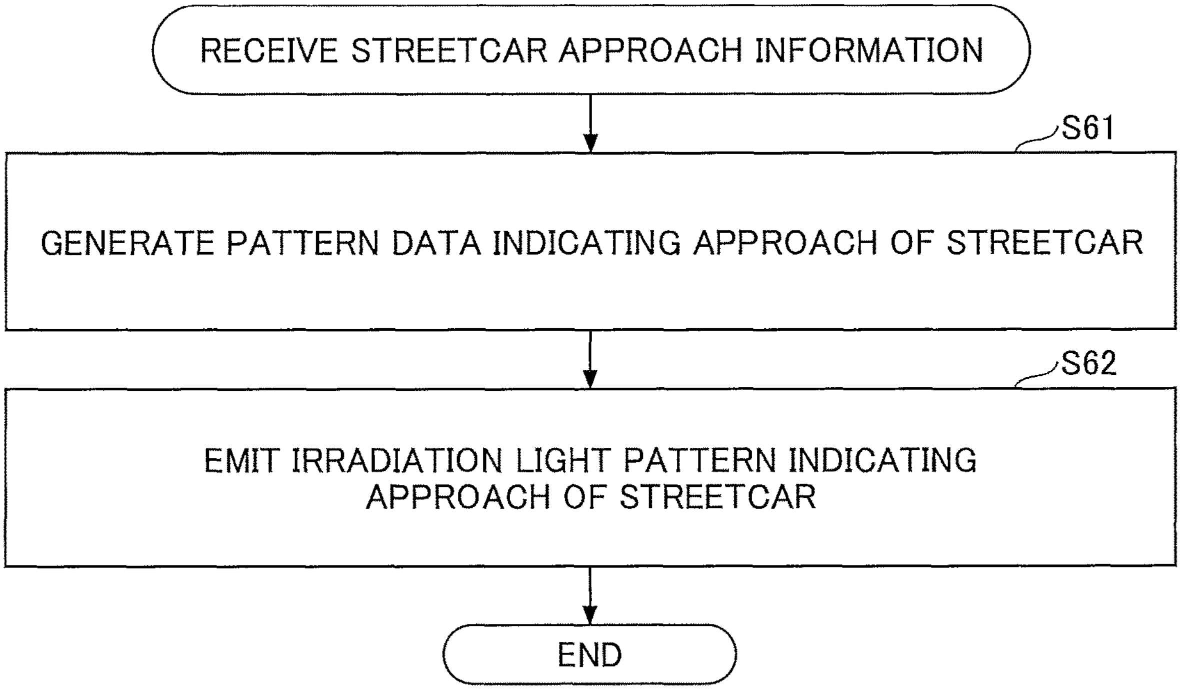
FIG. 24 is a flowchart illustrating a fifth example of a process performed by the controller according to the embodiment.

FIG. 24 is a flowchart illustrating a fifth example of a process performed by the controller 30. The fifth example of the process performed by the controller 30 is a process of irradiating the road surface 400 with the irradiation light pattern Lp-16 illustrated in FIG. 23.

Before the controller 30 starts the process illustrated in FIG. 24, the detection device 10 receives streetcar approach information U16 from the external server 40. The detection device 10 causes the transmission part 159 to transmit the streetcar approach information U16 to the controller 30.

For example, the controller 30 starts the process illustrated in FIG. 24 on the condition that the streetcar approach information U16 described above is received from the detection device 10.

First, in step S61, the controller 30 causes the generation part 243 to generate pattern data Pd16-1 indicating the approach of the streetcar.

Next, in step S62, based on the pattern data Pd16-1, the controller 30 causes the irradiation control part 245 to control the light emitting device 20 to irradiate the road surface 400 with the irradiation light pattern Lp-16 indicating the approach of the streetcar. In a situation in which the approach of the streetcar to the traffic object 500 is detected, the light emitting device 20 can emit the irradiation light pattern Lp-16 indicating the approach of the streetcar. By causing the light emitting device 20 to emit the irradiation light pattern Lp-16, the driver of the traffic object 500 can visually recognize the irradiation light pattern Lp-16, and thus can recognize that the streetcar is approaching.

The light emitting device 20 stops the irradiation of the irradiation light pattern Lp-16 after a predetermined irradiation period of time elapses. The controller 30 ends the process after the predetermined irradiation period of time elapses and the irradiation of the irradiation light pattern Lp-16 is stopped.

In this manner, the controller 30 can execute the process of irradiating the road surface 400 with the irradiation light pattern Lp-16. In a situation in which the streetcar approaches the traffic object 500, the light emitting device 20 can emit an irradiation light pattern Lp (for example, an emission pattern of green light) indicating that the traffic object 500 can proceed or an irradiation light pattern Lp (for example, an emission pattern of a red light) indicating that the traffic object 500 must stop.

The fifth example has been described by taking the streetcar as an example; however, the present disclosure is not limited thereto. For example, an irradiation light pattern indicating that a railroad vehicle such as a train approaches a traffic object located in the vicinity of a railroad crossing can be emitted onto the road surface.

Sixth Example

Figure 25:
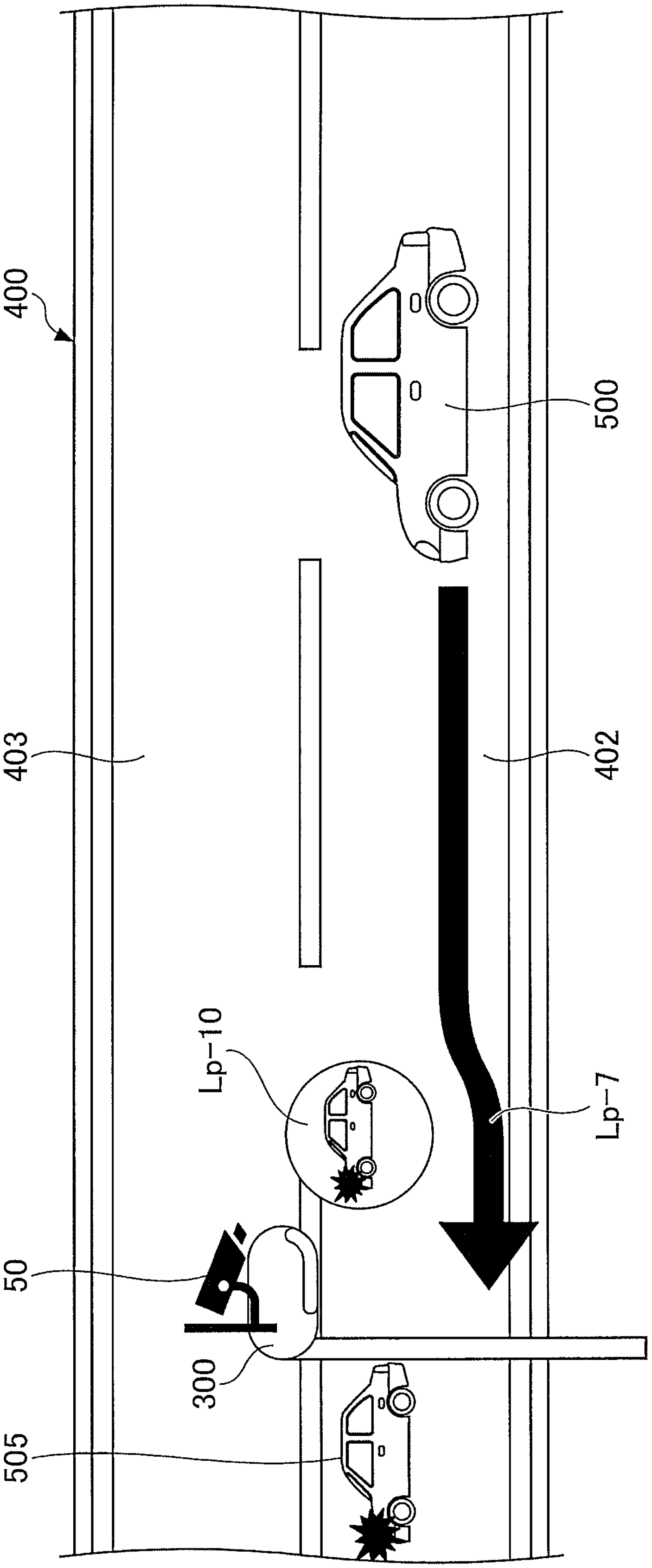
FIG. 25 is a schematic diagram illustrating a sixth example of an irradiation light pattern according to the embodiment.

FIG. 25 is a schematic diagram illustrating a sixth example of an irradiation light pattern Lp. In FIG. 25, the unit 50 is disposed in the street lamp 300. The traffic object 500 travels on the road surface 400. An accident vehicle 505 is located in a lane 402 in which the traffic object 500 travels, and is located ahead of the traffic object 500 in the traveling direction of the traffic object 500. In accordance with the situation of the accident vehicle detected by the detector, the light emitting device 20 of the unit 50 emits an irradiation light pattern Lp-10 onto the road surface 400, and also emits an irradiation light pattern Lp-7 for guiding the traffic object 500 onto the lane 402. The traffic object 500 is located behind the accident vehicle in the traveling direction.

The irradiation light pattern Lp-7 is for guiding the traffic object 500 to avoid the accident vehicle 505. The irradiation light pattern Lp-7 can be emitted onto a lane 403 other than the lane 402 in which the accident vehicle is located. For example, if the accident vehicle 505 blocks the lane 402 in which the traffic object 500 travels, and the traffic object 500 cannot pass through the lane 402, the light emitting device 20 can guide the traffic object 500 to pass through the lane 403 by emitting the irradiation light pattern Lp-7 onto the lane 403.

Figure 26:
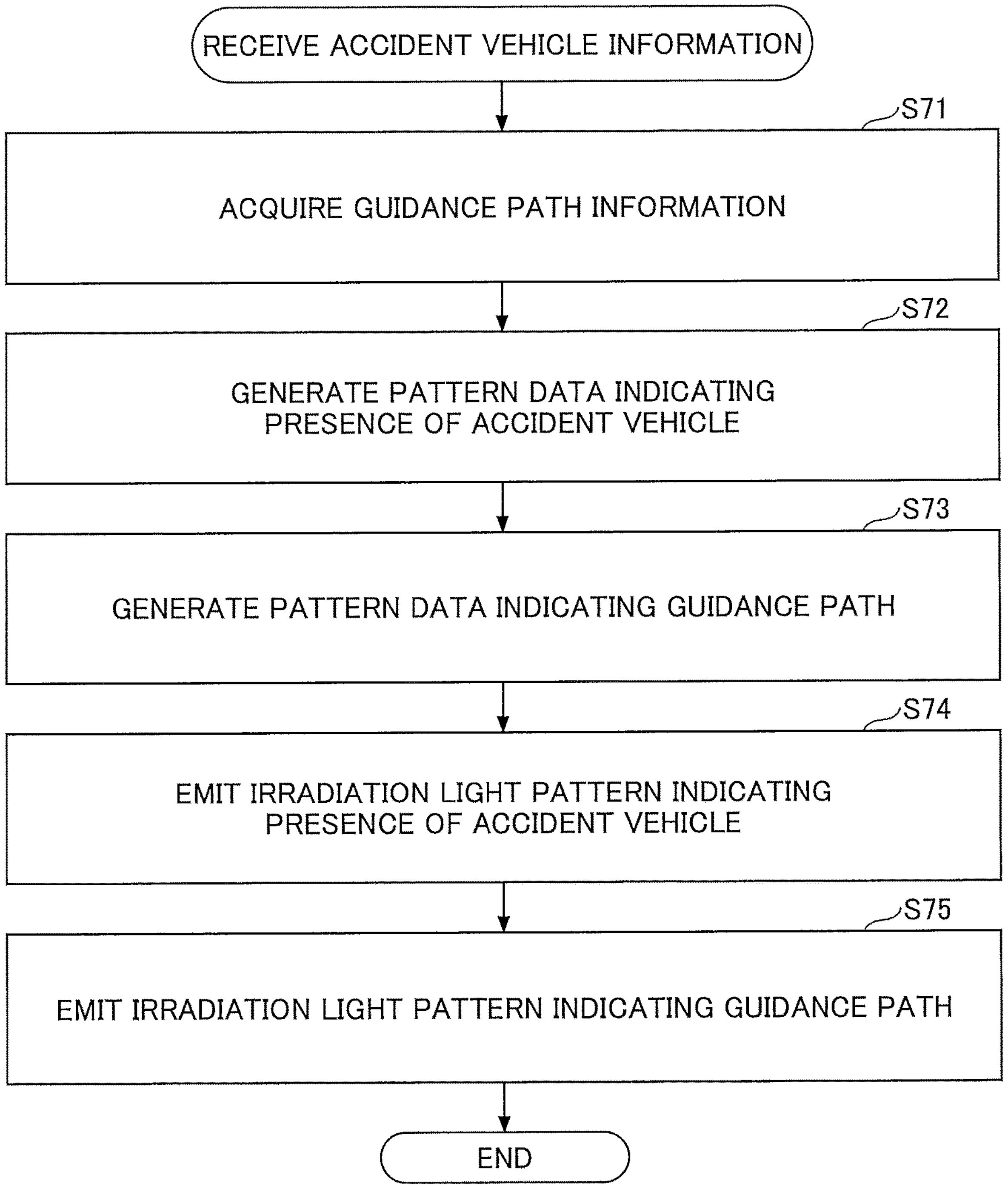
FIG. 26 is a flowchart illustrating a sixth example of a process performed by the controller according to the embodiment.

FIG. 26 is a flowchart illustrating a sixth example of a process performed by the controller 30. The sixth example of the process performed by the controller 30 is a process of irradiating the road surface 400 with the irradiation light pattern Lp-7 illustrated in FIG. 25.

Before the controller 30 starts the process illustrated in FIG. 26, the detection device 10 receives, from another unit 50 located near the accident vehicle via the network N, accident vehicle information U9 detected by the other unit 50 based on a captured image Im. The detection device 10 causes the transmission part 159 to transmit the accident vehicle information U9 to the controller 30. For example, a vehicle that stays at the same location for more than a predetermined period of time can be set as an accident vehicle. However, if the unit 50 illustrated in FIG. 25 is located closest to the accident vehicle among one or more units 50, the detection device 10 included in the unit 50 illustrated in FIG. 25 can detect the accident vehicle information U9 based on the captured image Im.

For example, the controller 30 starts the process illustrated in FIG. 26 on the condition that the accident vehicle information U9 described above is received from the detection device 10.

First, in step S71, the controller 30 causes the acquisition part 242 to acquire guidance path information U8 by performing image processing of a captured image Im to detect the lane 402 in which the accident vehicle is located, and an area on the road where the traffic object can travel.

Next, in step S72, the controller 30 causes the generation part 243 to generate pattern data Pd10-1 indicating the presence of the accident vehicle.

Next, in step S73, the controller 30 causes the generation part 243 to generate pattern data Pd7-1 indicating a guidance path.

The order of steps S72 and S73 can be changed as appropriate, or steps S72 and S73 can be executed in parallel.

Next, in step S74, based on the pattern data Pd10-1, the controller 30 causes the irradiation control part 245 to control the light emitting device 20 to irradiate the road surface 400 with the irradiation light pattern Lp-10 indicating the presence of the accident vehicle. In a situation in which the accident vehicle is detected, the light emitting device 20 can emit the irradiation light pattern Lp-10 indicating the presence of the accident vehicle to the traffic object 500 located behind the accident vehicle in the traveling direction of the traffic object 500. By causing the light emitting device 20 to emit the irradiation light pattern Lp-10, the driver of the traffic object 500 can visually recognize the irradiation light pattern Lp-10, and thus can recognize the presence of the accident vehicle ahead of the traffic object 500 in the traveling direction of the traffic object 500.

Next, in step S75, based on the pattern data Pd7-1, the controller 30 causes the irradiation control part 245 to control the light emitting device 20 to irradiate the road surface 400 with the irradiation light pattern Lp-7 indicating the guidance path. The light emitting device 20 can emit the irradiation light pattern Lp-10 indicating the presence of the accident vehicle onto the lane 402 in which the accident vehicle is located, and emit the irradiation light pattern Lp-7 for guiding the traffic object 500 onto the lane 402 in which the accident vehicle is located. As described above, the light emitting device 20 can emit the irradiation light pattern Lp-7 onto the lane 403 other than the lane 402 in which the accident vehicle is located.

The light emitting device 20 stops the irradiation of each of the irradiation light patterns Lp-10 and Lp-7 after a predetermined irradiation period of time elapses. The controller 30 ends the process after the predetermined irradiation period of time elapses and the irradiation of each of the irradiation light patterns Lp-10 and Lp-7 is stopped.

In this manner, the controller 30 can execute the process of irradiating the road surface 400 with the irradiation light patterns Lp-10 and Lp-7.

The light emitting device 20 can emit one irradiation light pattern among the irradiation light patterns Lp-10 and Lp-7, or can emit both the irradiation light patterns Lp-10 and Lp-7.

The sixth example has been described by taking the accident vehicle as an example; however, the present disclosure is not limited thereto. For example, other than the accident vehicle, a vehicle in an emergency stop due to a failure or the like can be detected. In another aspect, an abnormality on the road, such as a depression or a level difference of the road surface, construction, a falling object, or dirt on the road surface can be detected.

Seventh Example

Figure 27:
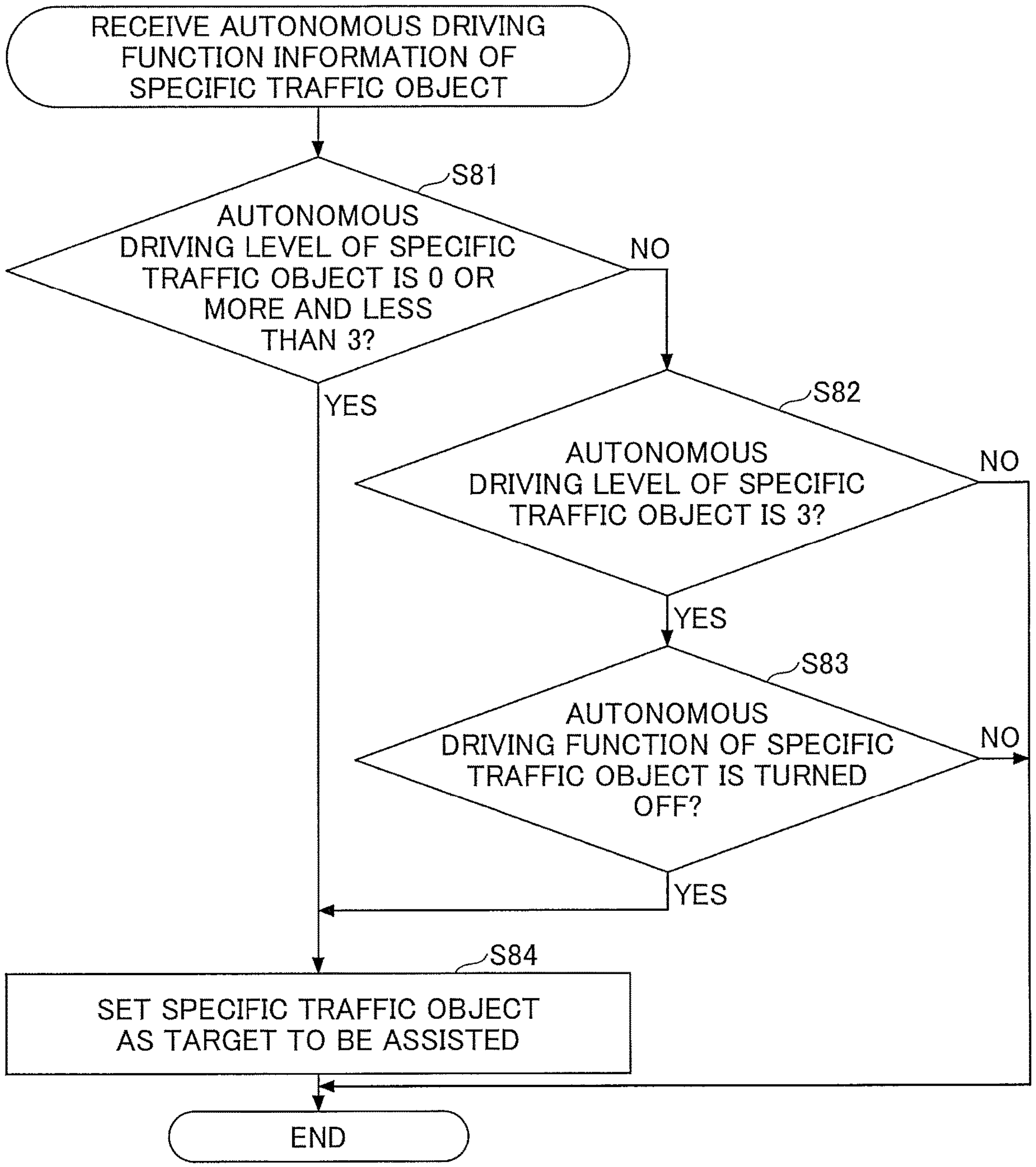
FIG. 27 is a schematic diagram illustrating a seventh example of an irradiation light pattern according to the embodiment.

FIG. 27 is a flowchart illustrating a seventh example of a process performed by the controller 30. The seventh example of the process performed by the controller 30 is a process of emitting an irradiation light pattern Lp with respect to a traffic object that is not using an autonomous driving function based on information on the autonomous driving function.

Before the controller 30 starts the process illustrated in FIG. 27, the detection device 10 receives autonomous driving function information U17 of a specific traffic object from the external server 40. The specific traffic object is, for example, a traffic object appearing in a captured image Im periodically acquired by the camera 11 of the detection device 10. The detection device 10 causes the transmission part 159 to transmit the autonomous driving function information U17 of the specific traffic object received from the external server 40 to the controller 30.

Table 2 below indicates an example of the autonomous driving function information U17. As indicated in Table 2, the autonomous driving function information U17 includes a "name", a "driving entity", and a "traveling area" for each level of autonomous driving. The detection device 10 causes the transmission part 159 to transmit the autonomous driving function information U17 to the controller 30.

TABLE 2

| LEVEL | NAMES | DRIVING ENTITY | TRAVELING AREA |
|---|---|---|---|
| 0 | NO DRIVING AUTOMATION | HUMAN | — |
| 1 | DRIVER ASSISTANCE | HUMAN | LIMITED |
| 2 | PARTIAL DRIVING AUTOMATION | HUMAN | LIMITED |
| 3 | CONDITIONAL DRIVING AUTOMATION | VEHICLE | LIMITED |
| 4 | HIGH DRIVING AUTOMATION | VEHICLE | LIMITED |
| 5 | FULL DRIVING AUTOMATION | VEHICLE | NO LIMITATION |

For example, the controller 30 starts the process illustrated in FIG. 27 on the condition that the autonomous driving function information U17 described above is received from the detection device 10.

First, in step S81, the controller 30 causes the generation part 243 to determine whether the autonomous driving level of the specific traffic object is 0 or more and less than 3.

If it is determined that the autonomous driving level is 0 or more and less than 3 in step S81 (YES in step S81), the controller 30 causes the process to proceed to step S84. Conversely, if it is determined that the autonomous driving level is not 0 or more and less than 3 in step S81 (NO in step S81), the controller 30 causes the generation part 243 to determine if the autonomous driving level of the specific traffic object is 3.

If it is determined that the autonomous driving level is not 3 in step S82 (NO in step S82), the controller 30 ends the process. Conversely, if it is determined that the autonomous driving level is 3 in step S82 (YES in step S82), the controller 30 determines whether the autonomous driving function of the specific traffic object is turned off in step S83. When the autonomous driving function is turned off, it means that the autonomous driving function is not operated in the specific traffic object.

If it is determined that the autonomous driving function is not turned off in step S83 (NO in step S83), the controller 30 ends the process. Conversely, if it is determined that the autonomous driving function is turned off in step S83 (YES in step S83), the controller 30 causes the process to proceed to step S84.

Next, in step S84, the controller 30 causes the generation part 243 to set the specific traffic object as a target to be assisted by the traffic system 100. That is, the traffic object that is not using the autonomous driving function is set as the target to be assisted based on the information on the autonomous driving function, and the light emitting device 20 irradiates the road surface 400 with an irradiation light pattern Lp for the traffic object. In this manner, for the driver who needs assistance or support in driving the traffic object, the light emitting device 20 and the traffic system 100 can assist or support the driver in driving the traffic object.

As described above, the controller 30 can execute the process of emitting the irradiation light pattern Lp with respect to the traffic object that is not using the autonomous driving function based on the information on the autonomous driving function. For example, the controller 30 can extract a traffic object to be assisted by the light emitting device 20 and the traffic system 100, by executing the process illustrated in FIG. 27 for each of a plurality of specific traffic objects appearing in an image captured by the camera 11 of the detection device 10.

Although embodiments have been described in detail above, the present disclosure is not limited to the above-described embodiments, and various modifications and substitutions can be made to the above-described embodiments without departing from the scope described in the claims.

For example, the road surface 400 irradiated with an irradiation light pattern Lp by the light emitting device 20 can be subjected to special treatment. Examples of the special treatment includes treatment for adding a black tint to the color of the road surface, treatment for increasing the reflectance of the road surface, treatment for including a phosphor in the road surface, and the like. By subjecting the road surface 400 to such special treatment, the visibility of the irradiation light pattern Lp by the driver of a traffic vehicle, a pedestrian, and the like can be improved.

Further, a traffic object itself can transmit traffic object type information U2, planned right/left turn information U3, traveling speed information U11, following-vehicle speed information U12, inter-vehicle distance information U13, or reference speed information U14, and can communicate with the controller 30 or the external server 40 via the Internet N.

Further, in a case where the light emitting device 20 emits an irradiation light pattern Lp for a detected traffic object, the light emitting device 20 can temporarily turn off the irradiation light pattern Lp or reduce the illuminance of the irradiation light pattern Lp if other traffic objects travel in the vicinity of the road surface irradiated with the irradiation light pattern Lp. Accordingly, the safety between traffic objects can be enhanced in road traffic.

Further, for a plurality of detected traffic objects, a single light emitting device 20 can emit irradiation light patterns Lp in accordance with the respective situations of the traffic objects. The single light emitting device 20 according to the present disclosure includes, for example, 100 or more and 2,000,000 or less light emitting elements. Thus, the single light emitting device 20 can emit the irradiation light patterns Lp in accordance with the respective situations of the plurality of detected traffic objects.

Further, the single light emitting device 20 can include a light source that emits light having different chromaticities. The light source can be constituted by light emitting elements 21, or can include light emitting elements 21 and a wavelength conversion member. By including the light source that emits light having different chromaticities, the light emitting device 20 can emit an irradiation light pattern having an appropriate chromaticity in accordance with the situation of a traffic object.

Further, the light emitting device 20, the detection device 10, the controller 30, the inclination mechanism 22, and the like, or some of these devices can be installed spaced apart from one another. For example, the installation location of a housing including the light emitting device 20 can be different from the installation location of a housing including the detection device 10 and the other devices.

Further, the light emitting device 20 can irradiate a traffic object itself with an irradiation light pattern Lp on the road.

Further, a method of generating pattern data by the generation part 243 is not limited to a method using irradiation light pattern information 440. For example, the generation part 243 can generate pattern data by estimating appropriate pattern data by using deep neural networks or the like based on traffic object situation information U. Based on the pattern data generated in this manner, the light emitting device 20 can irradiate the road surface 400 with an irradiation light pattern Lp.

The numbers such as ordinal numbers and quantities used in the description of the embodiments are all exemplified to specifically describe the technique of the present disclosure, and the present disclosure is not limited to the exemplified numbers. In addition, the connection relationship between the components is illustrated for specifically describing the technique of the present disclosure, and the connection relationship for implementing the functions of the present disclosure is not limited thereto.

Note that the division of the blocks illustrated in each functional block diagram is merely an example. A plurality of blocks can be implemented as a single block, a single block can be divided into a plurality of blocks, or some functions of a block can be transferred to another block. Further, single hardware or software can process the functions of a plurality of blocks having similar functions in parallel or in a time-sharing manner. Further, some or all of the functions can be distributed to a plurality of computers.

The light emitting device and the traffic system according to the present disclosure can emit an irradiation light pattern according to the detected situation of a traffic object, and thus can be suitably used, in particular, to improve the safety of traffic objects, facilitate traffic, or the like in road traffic.

However, the application of the light emitting device and the traffic system of according to the present disclosure is not limited to these applications.

According to an embodiment of the present disclosure, a light emitting device and a traffic system, in which an irradiation light pattern can be emitted in accordance with a detected situation of a traffic object, can be provided.

The invention claimed is:

1. A light emitting device for emitting a given irradiation light pattern, the light emitting device comprising:
- a plurality of light emitting elements configured to be individually turned on,
- wherein the light emitting device is configured to emit at least one irradiation light pattern onto a road surface in accordance with a detected type of a vehicle.

2. The light emitting device according to claim 1, wherein the light emitting device is disposed in at least one of a traffic light or a street lamp, and
- the light emitting device is configured to emit primary purpose light of at least one of the traffic light or the street lamp, and auxiliary light including the at least one irradiation light pattern in accordance with the detected type of the vehicle.

3. The light emitting device according to claim 2, wherein the auxiliary light is light for displaying a traffic sign.

4. The light emitting device according to claim 1, wherein the at least one irradiation light pattern is adjustable in accordance with a state of ambient light.

5. The light emitting device according to claim 1, wherein a position of the at least one irradiation light pattern emitted onto the road surface is changeable in accordance with a traveling speed of the vehicle.

6. The light emitting device according to claim 1, wherein
- the light emitting device is configured to emit an irradiation light pattern having a first chromaticity, in a situation in which a traveling speed of the vehicle exceeds a legal speed or a maximum speed or falls below a minimum speed based on information on a reference speed, and
- the information on the reference speed includes information on the legal speed determined by law on a per-traffic-object type basis, and information on at least one of the maximum speed or the minimum speed set for a road on which the vehicle travels.

7. The light emitting device according to claim 6, wherein, in a situation in which the traveling speed of the vehicle is close to the reference speed, the light emitting device is configured to emit an irradiation light pattern having a second chromaticity that is different from the first chromaticity.

8. The light emitting device according to claim 7, wherein the light emitting device is configured to further emit an irradiation light pattern that includes information indicating the maximum speed or the minimum speed of the road.

9. The light emitting device according to claim 1, wherein the vehicle includes a preceding vehicle and a following vehicle that follows the preceding vehicle, and
- the light emitting device is configured to emit the at least one irradiation light pattern based on information on an inter-vehicle distance between the preceding vehicle and the following vehicle and a traveling speed of the following vehicle.

10. The light emitting device according to claim 1, wherein, in a situation in which the vehicle is detected at an intersection or a corner and a direction indicator of the vehicle is turned on, the light emitting device is configured to emit an irradiation light pattern indicating that the vehicle is to turn right or left.

11. The light emitting device according to claim 10, wherein, in a situation in which entry into the intersection or the corner is prohibited based on information on traffic rules, the light emitting device is configured to emit an irradiation light pattern indicating that the entry is prohibited.

12. The light emitting device according to claim 10, wherein, in a situation in which a pedestrian is detected in a vicinity of the intersection or the corner toward which the vehicle is to proceed, the light emitting device is configured to emit an irradiation light pattern indicating presence of the pedestrian.

13. The light emitting device according to claim 1, wherein the light emitting device is configured to emit the at least one irradiation light pattern with respect to the vehicle that is not using an autonomous driving function based on information on the autonomous driving function.

14. A light emitting device for emitting a given irradiation light pattern, the light emitting device comprising:
- a plurality of light emitting elements configured to be individually turned on,
- wherein the light emitting device is configured to emit at least one irradiation light pattern onto a road surface in accordance with a detected situation of a traffic object, and
- wherein the light emitting device is configured to change a distance between the traffic object and a region irradiated with the at least one irradiation light pattern, based on at least one of information on a type of the traffic object or information on an eye level of a driver of the traffic object.

15. The light emitting device according to claim 1, wherein the light emitting device is configured to emit an irradiation light pattern indicating a path that allows an emergency vehicle to travel in an emergency.

16. The light emitting device according to claim 15, wherein the light emitting device is configured to emit an irradiation light pattern indicating approach of the emergency vehicle to the vehicle that travels ahead of the emergency vehicle.

17. The light emitting device according to claim 15, wherein the light emitting device is configured to emit an irradiation light pattern for defining an area where the emergency vehicle travels in the emergency and an area where the vehicle travels.

18. The light emitting device according to claim 1, wherein, in a situation in which approach of a streetcar to the vehicle is detected, the light emitting device is configured to emit an irradiation light pattern indicating the approach of the streetcar.

19. The light emitting device according to claim 1, wherein, in a situation in which an accident vehicle is detected, the light emitting device is configured to emit an irradiation light pattern indicating presence of the accident vehicle to the vehicle that travels behind the accident vehicle in a traveling direction of the vehicle.

20. The light emitting device according to claim 19, wherein the light emitting device is configured to emit the irradiation light pattern indicating the presence of the accident vehicle, onto a first lane in which the accident vehicle is located, and emit another irradiation light pattern for guiding the vehicle, onto either the first lane in which the accident vehicle is located or a second lane other than the first lane.

21. A traffic system comprising:

a detection device; and a light emitting device including a plurality of light emitting elements configured to be individually turned on, wherein the light emitting device is configured to emit an irradiation light pattern onto a road surface in accordance with a type of a vehicle, the type of vehicle being obtained based on detection information by the detection device.

22. The traffic system according to claim 21, further comprising a plurality of units, each of the plurality of units including the detection device and the light emitting device, wherein the plurality of units are arranged at predetermined intervals on a road.

23. The traffic system according to claim 21, wherein the detection device includes at least one selected from the group consisting of a camera, an ambient light sensor, a speed sensor, a distance sensor, and a communication section.

* * * * *